US012741440B2

(12) United States Patent
Toneff et al.

(10) Patent No.: US 12,741,440 B2
(45) Date of Patent: Sep. 22, 2026

(54) APPARATUS AND METHOD FOR MAKING A POUCH PACKAGE

(71) Applicant: Ranpak Corp., Concord Township, OH (US)

(72) Inventors: Steven M. Toneff, Willoughby, OH (US); Robert C. Cheich, Independence, OH (US); Dennis J. Wagner, Painesville, OH (US); Brian J. Stinard, Twinsburg, OH (US); Stanislau Yakubouski, Mayfield Heights, OH (US)

(73) Assignee: Ranpak Corp., Concord Township, OH (US)

( * ) Notice: Subject to any disclaimer, the term of this patent is extended or adjusted under 35 U.S.C. 154(b) by 194 days.

(21) Appl. No.: 18/704,043

(22) PCT Filed: Oct. 28, 2022

(86) PCT No.: PCT/US2022/048281
§ 371 (c)(1),
(2) Date: Apr. 23, 2024

(87) PCT Pub. No.: WO2023/076628
PCT Pub. Date: May 4, 2023

(65) Prior Publication Data

US 2026/0151980 A1 Jun. 4, 2026

Related U.S. Application Data

(60) Provisional application No. 63/263,205, filed on Oct. 28, 2021.

(51) Int. Cl.
*B31D 5/00* (2017.01)

(52) U.S. Cl.
CPC .... *B31D 5/0065* (2013.01); *B31D 2205/0023* (2013.01); *B31D 2205/0047* (2013.01); *B31D 2205/0058* (2013.01)

(58) Field of Classification Search
CPC .......... B31D 5/0065; B31D 2205/0023; B31D 2205/0047; B31D 2205/0058;
(Continued)

(56) References Cited

U.S. PATENT DOCUMENTS

| | | | | |
|---|---|---|---|---|
| 5,746,871 A * | 5/1998 | Walsh | B31B 50/16 | 229/800 |
| 6,332,488 B1 * | 12/2001 | Walsh | B32B 37/1292 | 229/800 |

(Continued)

FOREIGN PATENT DOCUMENTS

| | | |
|---|---|---|
| EP | 1069045 A1 | 1/2001 |
| JP | S5521093 U | 2/1980 |

(Continued)

OTHER PUBLICATIONS

International Search Report and Written Opinion mailed May 12, 2023, for International Application No. PCT/US2022/048281.

*Primary Examiner* — Jacob A Smith
(74) *Attorney, Agent, or Firm* — Renner, Otto, Boisselle & Sklar, LLP

(57) ABSTRACT

An automated pouch package-making apparatus includes a dunnage conversion apparatus and an enveloping apparatus. The dunnage conversion apparatus includes a layering device to layer an upper cover sheet material upon a lower cover sheet material with an expanded slit-sheet material therebetween, and a cross pressure applicator to apply a pressure to the layered product to bond via an adhesive a lower surface of the upper cover sheet material to an upper surface of the lower cover sheet material, thereby forming a strip of expanded dunnage. The enveloping apparatus
(Continued)

includes a folding device to fold the strip upon itself, at a cross-wise extending crease, such that an upper surface of a first strip portion overlays an upper surface of a second strip portion, and to compress the opposite longitudinal sides of the strip along respective locations of longitudinally extending adhesive to bond the opposite longitudinal sides of the strip.

20 Claims, 20 Drawing Sheets

(58) Field of Classification Search

CPC .... B31D 2205/0082; B31D 2205/0064; B31D 5/006; B31D 5/0043; B31D 5/0039; B31D 3/0284

USPC ........ 193/340, 276, 287, 288, 293, 331, 464

See application file for complete search history.

(56) References Cited

U.S. PATENT DOCUMENTS

| | | | | |
|---|---|---|---|---|
| 7,871,363 | B1 * | 1/2011 | Branyon | B65D 5/5047 493/287 |
| 2006/0025293 | A1 * | 2/2006 | Moen | B31F 1/2854 493/84 |
| 2012/0316046 | A1 * | 12/2012 | Jackels | A61F 13/15642 493/374 |
| 2019/0100369 | A1 | 4/2019 | Hoffman et al. | |
| 2020/0230908 | A1 * | 7/2020 | Goodrich | B31D 1/0031 |

FOREIGN PATENT DOCUMENTS

| | | | | |
|---|---|---|---|---|
| WO | 96/01731 | A1 | 1/1996 | |
| WO | 2013/184649 | A1 | 12/2013 | |
| WO | 2019043760 | W | 3/2019 | |
| WO | WO2021174150 | A1 * | 9/2021 | B31D 1/00 |

* cited by examiner

APPARATUS AND METHOD FOR MAKING A POUCH PACKAGE

This application is a national phase of International Application No. PCT/US2022/048281, filed Oct. 28, 2022, which claims priority to U.S. Application No. 63/263,205, filed Oct. 28, 2021, each of which is hereby incorporated herein by reference in its entirety.

FIELD OF THE INVENTION

The present invention relates generally to a pouch package, such as a mailing envelope, and more particularly to an apparatus and method for making a pouch package with a cushioning component.

BACKGROUND

Padded mailers, such as padded envelopes, are often used to ship items, particularly fragile items. Padded mailers are typically made with plastic air-bubble material lining the inside of the mailer, however, alternatives such as foam, recycled fiber fluff, and paper-based cushioning material may be used. Padded mailers, packages with a cushioning component, referred to herein as pouch packages, provide a pouch into which an article can be placed that has some cushioning to protect the article during shipment. The pouch package typically is formed by front and rear sheets connected at their respective bottom edges and along each of their respective opposing side edges, while remaining unconnected at their respective top edges. The pouch package also includes a liner or other component made of a cushioning material to provide additional protection for the article inside the pouch package. The pouch package may also include a seal to close the opening at the top edges of the pouch package.

SUMMARY OF THE INVENTION

The invention relates to an automated pouch package-making apparatus including a dunnage conversion apparatus that converts sheet material into a longitudinal strip of expanded dunnage, and an enveloping apparatus that makes the expanded dunnage into a pouch package. Automating the pouch package-making process provides a pouch with more consistent properties, faster, with minimal operator intervention.

According to one aspect of the invention, a dunnage conversion apparatus for converting an upper cover sheet material, a lower cover sheet material and an expanded slit-sheet material into a strip of expanded dunnage, includes a feeder, a cross adhesive applicator, a layering device, and a cross pressure applicator. The feeder is configured to feed an upper cover sheet material, a lower cover sheet material and an expanded slit-sheet material, each having parallel opposite side edges, in a longitudinal direction through the apparatus. The cross adhesive applicator is configured to apply adhesive across the upper surface of the lower cover sheet material in a direction perpendicular to the parallel opposite side edges of the lower cover sheet material. The layering device is downstream of the cross adhesive applicator and is configured to layer the upper cover sheet material upon the upper surface of the lower cover sheet material with the expanded slit-sheet material therebetween to form a layered product. The cross pressure applicator is configured to apply a pressure to the layered product at the location of the adhesive applied across the upper surface of the lower cover sheet material to bond the lower surface of the upper cover sheet material to the upper surface of the lower cover sheet material.

Embodiments of the invention may include one or more of the following additional features separately or in combination.

The cross pressure applicator may be configured to apply a pressure to the layered product as the upper cover sheet material, the lower cover sheet material and the expanded slit-sheet material are fed through the apparatus.

The cross pressure applicator may include a cammed roller extending across the layered product and configured, when rotated, to compress the layered product at the location of the adhesive applied across the upper surface of the lower cover sheet material.

The cross adhesive applicator may be configured to apply the adhesive across the upper surface of the lower cover sheet material as the lower cover sheet material is fed through the apparatus.

The cross adhesive applicator may include an adhesive head configured to move across the lower cover sheet material in a direction transverse to the longitudinal direction.

The cross adhesive applicator may include a linear actuator configured to translate the adhesive head across the lower cover sheet material along a linear path.

The linear path may be at a non-perpendicular angle relative to the longitudinal direction.

The cross adhesive applicator may include an adhesive head having a split nozzle to apply parallel first and second beads of adhesive across the upper surface of the lower cover sheet material, the first and second beads being spaced apart in the longitudinal direction.

The cross pressure applicator may include a cammed roller extending across the layered product and configured, when rotated, to compress the layered product at the location of the first and second beads of adhesive applied across the upper surface of the lower cover sheet material.

The apparatus may further include a side adhesive applicator configured to apply adhesive to an upper surface of the lower cover sheet material adjacent opposite longitudinal sides of the lower cover sheet material (or to a lower surface of the upper cover sheet material adjacent opposite longitudinal sides of the upper cover sheet material).

The side adhesive applicator may be configured to apply the adhesive to the upper surface of the lower cover sheet material as the lower cover sheet material is fed through the apparatus.

The apparatus may further include a side pressure applicator configured to apply a pressure to the layered product at the location of the adhesive applied to the opposite sides of the lower cover sheet material to bond the lower surface of the upper cover sheet material to the upper surface of the lower cover sheet material.

The side pressure applicator may be configured to apply the pressure to the layered product as the upper cover sheet material, the lower cover sheet material and the expanded slit-sheet material are fed through the apparatus.

The side pressure applicator may include first and second pairs of upper and lower bonding rollers at respective opposite sides of the layered product, the upper bonding rollers and the lower bonding rollers being configured to pinch the opposite sides of the layered product as the layered product passes between the upper bonding rollers and the lower bonding rollers.

The apparatus may be combined with an expander, wherein the expander is configured to expand a slit-sheet material into the expanded slit-sheet material, wherein in the longitudinal direction the cross adhesive applicator is downstream of the expander.

The apparatus may further include a cutter configured to sever a discrete strip of expanded dunnage from the layered product between the first and second beads of adhesive.

According to another aspect of the invention, a method is provided for converting an upper cover sheet material, a lower cover sheet material and an expanded slit-sheet material into a strip of expanded dunnage. The method includes feeding an upper cover sheet material, a lower cover sheet material and an expanded slit-sheet material, each having parallel opposite side edges, in a longitudinal direction; applying adhesive across the upper surface of the lower cover sheet material in a direction perpendicular to the parallel opposite side edges of the lower cover sheet material; layering the upper cover sheet material upon the upper surface of the lower cover sheet material with the expanded slit-sheet material therebetween to form a layered product; and, applying a pressure to the layered product at the location of the adhesive applied across the upper surface of the lower cover sheet material to bond the lower surface of the upper cover sheet material to the upper surface of the lower cover sheet material.

Embodiments of the invention may include one or more of the following additional features separately or in combination.

The method may include applying the pressure to the layered product as the upper cover sheet material, the lower cover sheet material and the expanded slit-sheet material are fed in the longitudinal direction.

The method may include applying the adhesive across the upper surface of the lower cover sheet material as the lower cover sheet material is fed in the longitudinal direction.

The method may further include applying adhesive to an upper surface of the lower cover sheet material adjacent opposite longitudinal sides of the lower cover sheet material.

The method may include applying the adhesive to the upper surface of the lower cover sheet material as the lower cover sheet material is fed in the longitudinal direction.

According to another aspect of the invention, an apparatus for making a pouch package from a strip of expanded dunnage having upper and lower surfaces, opposite leading and trailing ends and opposite longitudinal sides, includes a creaser, an adhesive applicator, and a folding device. The creaser is configured to crease the strip with a cross-wise extending crease across the width of the strip at a location longitudinally between the leading and trailing ends of the strip to form a first strip portion and a second strip portion on longitudinally opposite sides of the cross-wise extending crease. The adhesive applicator is configured to apply an adhesive on the upper surface of the second strip portion at each of the opposite longitudinal sides of the second strip portion from the cross-wise extending crease longitudinally toward one of the leading end and the trailing end of the strip. The folding device is configured to fold the strip upon itself, at the cross-wise extending crease, such that the upper surface of the first strip portion overlays the upper surface of the second strip portion, and to compress the opposite longitudinal sides of the first strip portion to the respective opposite longitudinal sides of the second strip portion along the respective locations of the longitudinally extending adhesive to bond the opposite longitudinal sides of the first strip portion to the respective opposite longitudinal sides of the second strip portion.

According to another aspect of the invention, the upper cover sheet material may be omitted. A dunnage conversion apparatus for converting a lower cover sheet material and an expanded slit-sheet material into a strip of expanded dunnage includes a feeder configured to feed a lower cover sheet material and an expanded slit-sheet material, each having parallel opposite side edges, in a longitudinal direction through the apparatus. The apparatus further includes an adhesive applicator configured to apply adhesive to the upper surface of the lower cover sheet material, a layering device downstream of the adhesive applicator that is configured to layer the upper surface of the lower cover sheet material with the expanded slit-sheet material to form a layered product; and a pressure applicator configured to apply a pressure to the layered product at the location of the adhesive applied to the upper surface of the lower cover sheet material to bond the expanded slit-sheet material to the upper surface of the lower cover sheet material.

Embodiments of the invention may include one or more of the following additional features separately or in combination.

The creaser, the adhesive applicator, and the folding device may be configured such that the strip is fed nonstop through the apparatus.

The folding device may include a drive mechanism that has upper and lower drive belts that frictionally engage the respective upper and lower surfaces of the strip to constrain and to drive the strip through the folding device along a path.

The folding device may include a deflector that is configured to move between a deflecting position at which the deflector deflects the first strip portion from a pre-deflector path and a retracted position at which the deflector does not deflect the first strip portion from the pre-deflector path.

The deflector may be configured to move to the retracted position when the cross-wise extending crease reaches the deflector.

The folding device may include a deflector that is configured to deflect the first strip portion from a pre-deflector path to a post-deflector path, wherein the post-deflector path is sloped relative to the pre-deflector path.

The folding device may further include a drive mechanism that drives the strip to the deflector to fold, at the cross-wise extending crease, the first strip portion partially toward the second strip portion, and a pinch mechanism that receives the partially folded strip and further folds the partially folded strip such that the upper surface of the first strip portion overlays the upper surface of the second strip portion.

The folding device may include a pinch mechanism and a drive mechanism that drives the strip into the pinch mechanism, wherein the pinch mechanism is configured, in response to the drive mechanism driving the strip into the pinch mechanism, to urge the upper surface of the first strip portion toward the upper surface of the second strip portion.

The pinch mechanism may be further configured to drive the strip therethrough to urge the upper surface of the first strip portion to overlay the upper surface of the second strip portion.

The drive mechanism and the pinch mechanism may be mechanically linked.

The folding device may include a pinch mechanism that has first and second pairs of upper and lower press wheels at respective opposite sides of the strip, the upper press wheels and the lower press wheels being configured to compress the opposite sides of the first strip portion to the respective opposite sides of the second strip portion as the strip is driven through the pinch mechanism.

The folding device may include a drive mechanism that has upper and lower drive belts that frictionally engage the respective upper and lower surfaces of the strip to drive the strip through the drive mechanism and to the pinch mechanism.

The belts of the drive mechanism and the upper and lower press wheels of the pinch mechanism may be driven by a single motor.

According to another aspect of the invention, a method is provided for making a pouch package from a strip of expanded dunnage having upper and lower surfaces, opposite leading and trailing ends and opposite longitudinal sides. The method includes creasing the strip with a cross-wise extending crease across the width of the strip at a location longitudinally between the leading and trailing ends of the strip to form a first strip portion and a second strip portion on longitudinally opposite sides of the cross-wise extending crease; applying an adhesive on the upper surface of the second strip portion at each of the opposite longitudinal sides of the second strip portion from the cross-wise extending crease longitudinally toward one of the leading end and the trailing end of the strip; folding the strip upon itself, at the cross-wise extending crease, such that the upper surface of the first strip portion overlays the upper surface of the second strip portion; and compressing the opposite longitudinal sides of the first strip portion to the respective opposite longitudinal sides of the second strip portion along the respective locations of the longitudinally extending adhesive to bond the opposite longitudinal sides of the first strip portion to the respective opposite longitudinal sides of the second strip portion.

Embodiments of the invention may include one or more of the following additional features separately or in combination.

The method may include deflecting the first strip portion from a pre-deflector path to a post-deflector path, wherein the post-deflector path is sloped relative to the pre-deflector path.

The method may include stopping deflecting the first strip portion when the cross-wise extending crease reaches a path change location between the pre-deflector path and the post-deflector path.

The method may further include pinching opposite sides of the strip between first and second pairs of upper and lower press wheels at respective opposite sides of the strip to compress, as the strip is pinched, the opposite sides of the first strip portion to the respective opposite sides of the second strip portion.

The method may further include frictionally engaging the respective upper and lower surfaces of the strip to drive the strip to the first and second pairs of upper and lower press wheels.

The foregoing and other features of the invention are hereinafter described in greater detail with reference to the accompanying drawings.

DETAILED DESCRIPTION

Figure 1:
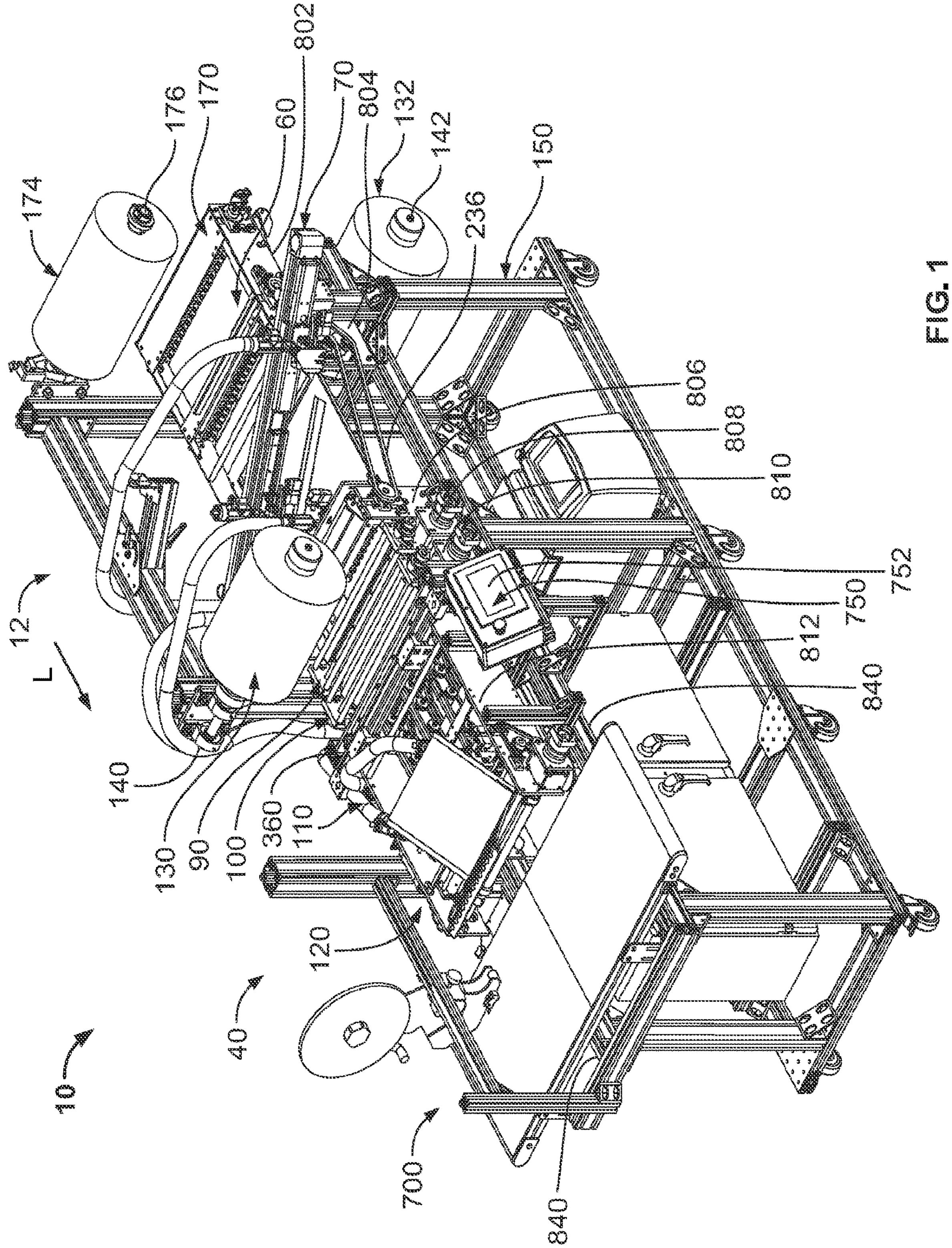
FIG. 1 is a top perspective view of an automated pouch package-making apparatus according to an embodiment of the invention.

When reduced to practice, the present invention can take many different forms. For the purpose of promoting an understanding of the principles of the invention a limited number of embodiments are illustrated in the drawings and are described with specific language in the following paragraphs. Nevertheless, no limitation of the scope of the invention is intended by describing only one or a limited number of embodiments. Any alterations and further modifications of the described embodiments, and any further applications of the principles of the invention as described herein, are contemplated as would normally occur to one skilled in the art to which the invention relates.

FIGS. 1-17 show an exemplary automated pouch package-making apparatus 10. The automated pouch package-making apparatus 10 includes a dunnage conversion apparatus 12 that converts sheet material 20, 22, 24 into a longitudinal strip of expanded dunnage 30 (see FIG. 9), and an enveloping apparatus 40 downstream of the dunnage conversion apparatus 12 that forms the expanded dunnage 30 into a pouch package 50 (see FIG. 16).

As will be described in greater detail below, the dunnage conversion apparatus 12 includes multiple portions, described in sequence moving in a downstream direction as a feeder 60, a cross adhesive applicator 70, a layering device 80, and a cross pressure applicator 90. A supply of sheet stock material includes an upper cover sheet material 20, a lower cover sheet material 22, and an expandable slit-sheet material 24, each having respective parallel opposite side edges 20A, 20B; 22A, 22B; 24A, 24B; and each provided from a separate supply in the form of respective rolls in a downstream direction parallel to a longitudinal dimension of the sheet materials 20, 22, and 24 (parallel to the side edges 20A, 20B; 22A, 22B; 24A, 24B, respectively), also referred to as a longitudinal direction L through the apparatus 12. The feeder 60 is configured to advance and expand the expandable slit-sheet material 24.

The cross adhesive applicator 70 is configured to apply adhesive 76, 78 across the upper surface 22U of the lower cover sheet material 22 in a direction perpendicular to the parallel opposite side edges 22A, 22B of the lower cover sheet material 22. The layering device 80 is configured to layer the upper cover sheet material 20 upon the upper surface 22U of the lower cover sheet material 22 with the expanded slit-sheet material 24 therebetween to form a layered product 86. The cross pressure applicator 90 is configured to apply a pressure to the layered product 86 at the location of the adhesive 76, 78 applied across the upper surface 22U of the lower cover sheet material 22 to bond the lower surface 20L of the upper cover sheet material 20 to the upper surface 22U of the lower cover sheet material 22, thereby yielding the longitudinal strip of expanded dunnage 30. The dunnage conversion apparatus 12 thus enables the automatic manufacture of the longitudinal strip of expanded dunnage 30 suitable for a pouch package 50 to ensure a consistent expansion, adhesive application, layering and bonding of the layered strip of expanded dunnage 30.

From the dunnage conversion apparatus 12 the strip of expanded dunnage 30 advances to the enveloping apparatus. As will be described in greater detail below, the enveloping apparatus 40 forms a pouch package 50 from a longitudinal strip of expanded dunnage 30, such as the strip of expanded dunnage 30 provided by the dunnage conversion apparatus 12. The enveloping apparatus 40 also includes multiple portions, including a creaser 100, an adhesive applicator 110, and a folding device 120. The creaser 100 is configured to crease the strip of expanded dunnage 30 with a cross-wise extending crease 106 across the width of the strip 30 at a location longitudinally between leading and trailing ends 300, 30D of the strip 30 to form a first strip portion 32 and a second strip portion 34 on longitudinally opposite sides of the cross-wise extending crease 106.

Then the adhesive applicator 110 is configured to apply an adhesive 116 on the upper surface 34U of the second strip portion 34 (upper surface of the upper cover sheet material 20) at each of the opposite sides 34A, 34B of the second strip portion 34 from the cross-wise extending crease 106 longitudinally toward the trailing end 30D of the strip 30. The folding device 120 is configured to fold the strip 30 upon itself, at the cross-wise extending crease 106. Upon folding the upper surface 32U of the first strip portion 32 overlays the upper surface 34U of the second strip portion 34. The folding device 120 also is configured to compress the opposite sides 32A, 32B of the first strip portion 32 to the respective opposite sides 34A, 34B of the second strip portion 34 along the respective locations of the longitudinally extending adhesive 116 to bond the opposite sides 32A, 32B of the first strip portion 32 to the respective opposite sides 34A, 34B of the second strip portion 34, thereby yielding the pouch package 50. Once the pouch package 50 is formed, the pouch package 50 is delivered to a closing-adhesive station 700 that applies a closing-adhesive strip to the pouch package 50 to enable a user to seal an open side of the pouch package 50. The enveloping apparatus 40 enables the manufacture of the pouch package 50 faster and with greater consistency than could be performed manually by an operator.

These various portions of the automated pouch-package making apparatus will now be described in turn in further detail. Turning now to FIGS. 1-4, the feeder 60 feeds the sheet materials 20, 22, 24 in the longitudinal direction L. As used herein, the longitudinal direction L is the length direction of the sheet materials 20, 22, 24, that is right to left and left to right in the figures, where the right to left 10 direction corresponds to the feed direction of the sheet materials 20, 22, 24 through the dunnage conversion apparatus 12 (this feed direction also is referred to as the downstream direction through the dunnage conversion apparatus 12, and the opposite direction is an upstream direction).

The sheet materials 20, 22, 24 preferably include or are made of paper, particularly kraft paper, to provide a packaging pouch that is recyclable, reusable, and composed of a renewable resource. The sheet materials 20, 22, 24 may all be made of the same or different materials and may have the same basis weights or different basis weights. Additionally, the upper cover sheet material 20 and the lower cover sheet material 22 typically have the same dimensions, although the upper cover sheet material 20, which will form the inner surface of the resulting product, can be narrower than the lower cover sheet material 22 to reduce the "stiffness" and minimize or completely hide any misalignment between the upper cover sheet material 20 and the lower cover sheet material 22. As a further alternative, the upper cover sheet material 20 can be omitted entirely and the expanded slit-sheet material 24 may form the inside face of the resulting pouch product. The expanded slit-sheet material 24 typically will have different width and thickness dimensions in comparison to those dimensions of the upper cover sheet material 20 and the lower cover sheet material 22, narrower in width and thicker when expanded than at least the lower cover sheet material 22. The upper cover sheet material 20 and the lower cover sheet material 22 are flat sheets of material supplied from respective rolls 130, 132. The rolls 130, 132 are mounted on respective spindles 140, 142, and the spindles 140, 142 in turn are rotatably mounted to a frame 150 of the dunnage conversion apparatus 12.

The feeder 60 includes a first set of rollers 160 that feed the expandable slit-sheet material 24 in the longitudinal direction L and a second set of rollers 162 that feed the joined or layered sheet materials 20, 22, 24, that is, together the upper cover sheet material 20, the lower cover sheet material 22, and the expanded slit-sheet material 24, in the longitudinal direction L.

In the illustrated embodiment, the expanded slit-sheet material 24 is provided by an expander 170 portion of the dunnage conversion apparatus 12. The expander 170 expands an expandable slit-sheet material 172 fed off of a roll 174. The roll 174 is mounted on a spindle 176, which in turn is rotatably mounted to the frame 150 of the dunnage conversion apparatus 12. The expandable slit-sheet material 172 is die-cut or otherwise pre-cut with a plurality of transversely-extending rows perpendicular to the longitudinal direction L. Each row has multiple spaced cuts in the sheet material, with the cuts in adjacent rows being transversely offset.

The expander 170 includes an upstream or "infeed" set of rollers 180 and a downstream or "expansion" set of rollers 160. In the illustrative embodiment, the downstream set of rollers 160 are the same as the afore described first set of rollers 160. In an alternate embodiment, the downstream set of rollers 160 may be different from the first set of rollers 160. The expander 170 expands or stretches the die cut paper 172 by rotating the upstream set of rollers 180 and the downstream set of rollers 160 at different speeds, specifically rotating the downstream set of rollers 160 faster than the upstream set of rollers 180. This causes the expandable slit-sheet material 172 to stretch to form the expanded slit-sheet material 24, with the cuts opening and material adjacent the cuts rotating out of its formerly-planar state—thereby providing an expanded slit-sheet material 24 that is longer, thicker, and narrower than the expandable slit-sheet material 172. In an alternative embodiment, the expander 170 may be omitted and the expanded slit-sheet material 24 may be provided in an already-expanded form from a supply, such as a roll, of expanded slit-sheet material. Using the expander 170, however, allows for a more compact roll 174 of expandable slit-sheet material of a given length in comparison to a roll of an equivalent length of expanded slit-sheet material 24.

Figure 2A:
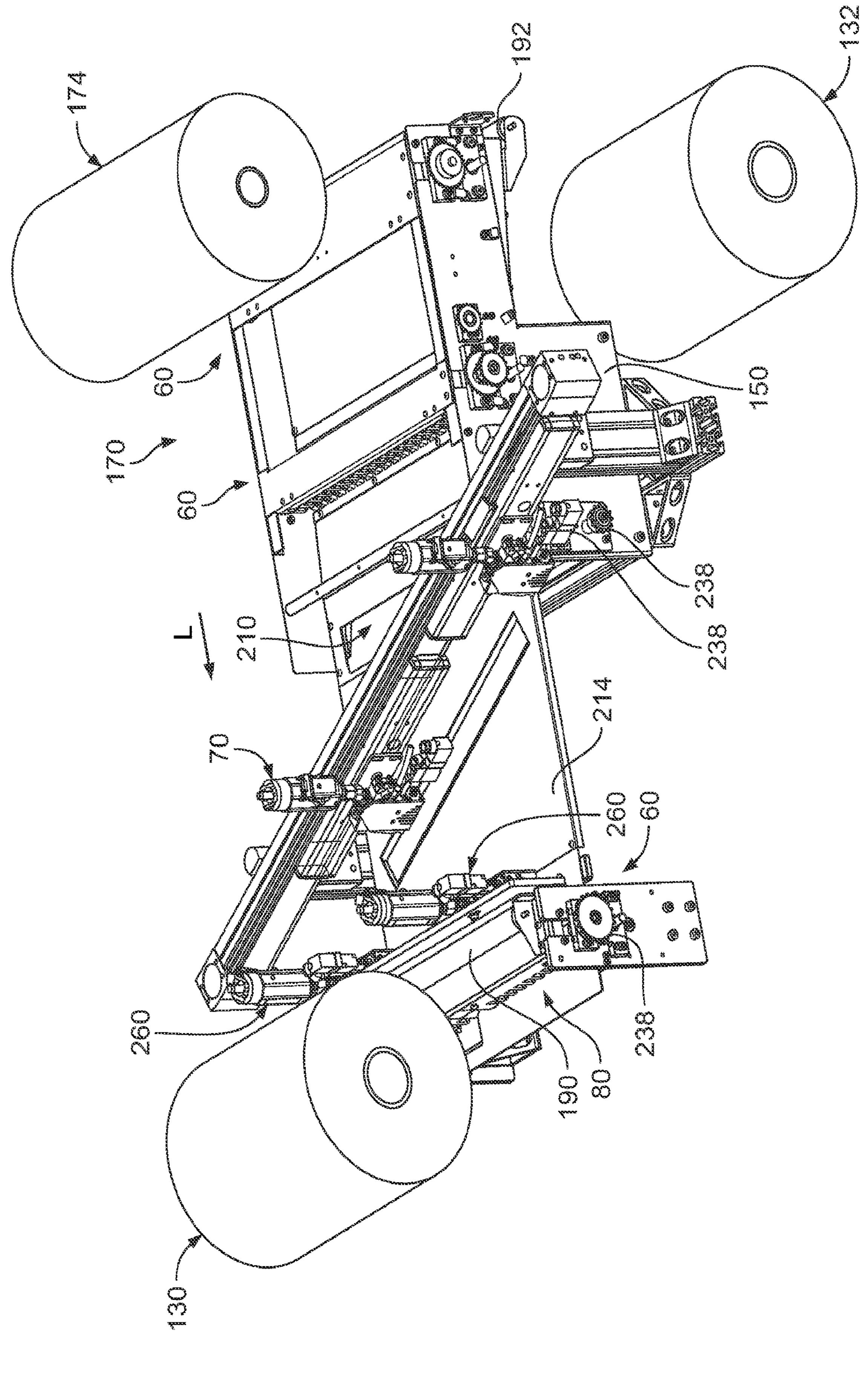
FIG. 2A shows an enlarged perspective view of a feeder, a side adhesive applicator, and expander portions of the apparatus of FIG. 1.
Figure 2B:
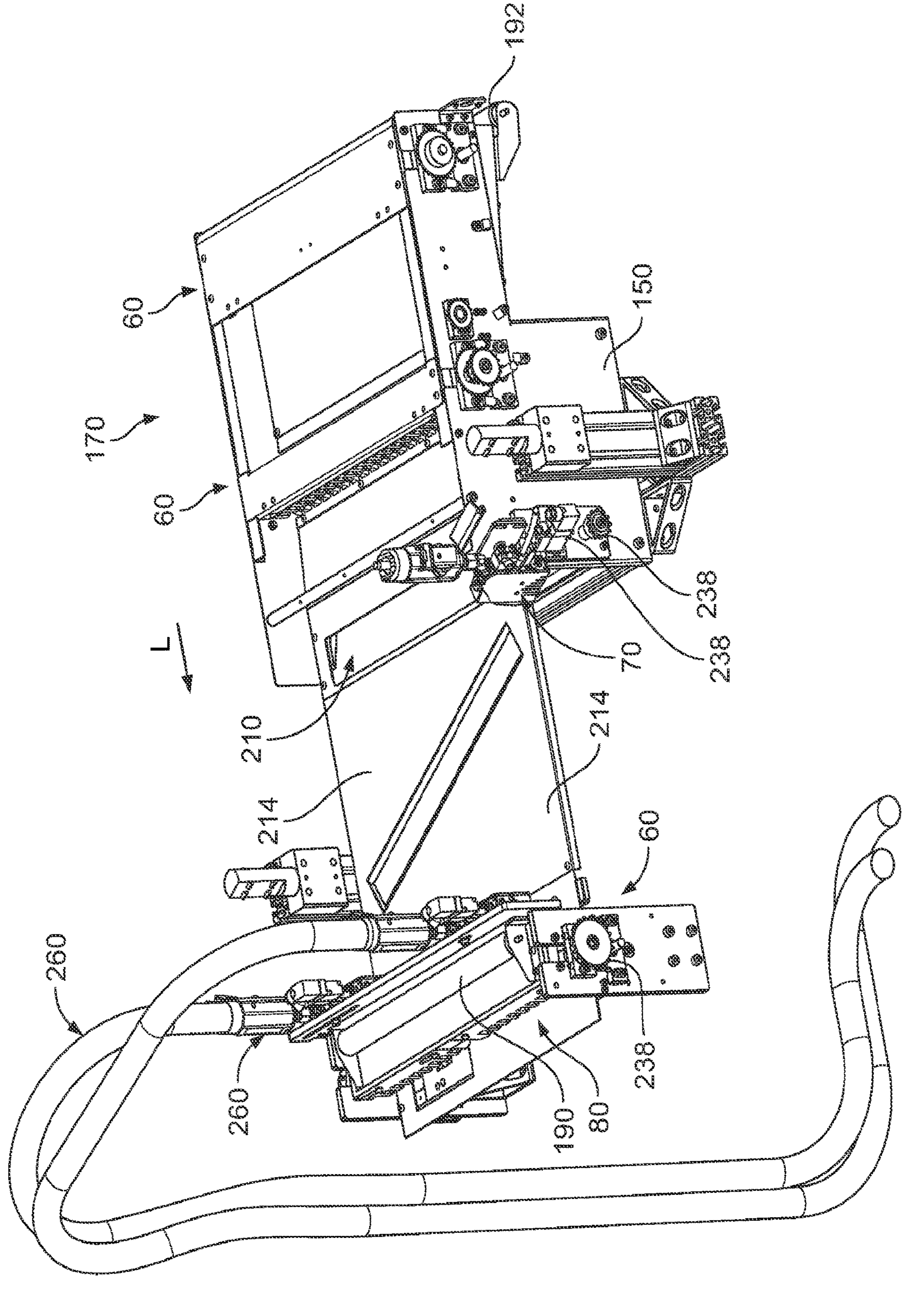
FIG. 2B shows an enlarged perspective view of a feeder, a cross adhesive applicator, a side adhesive applicator, and expander portions of the apparatus of FIG. 1.
Figure 3A:
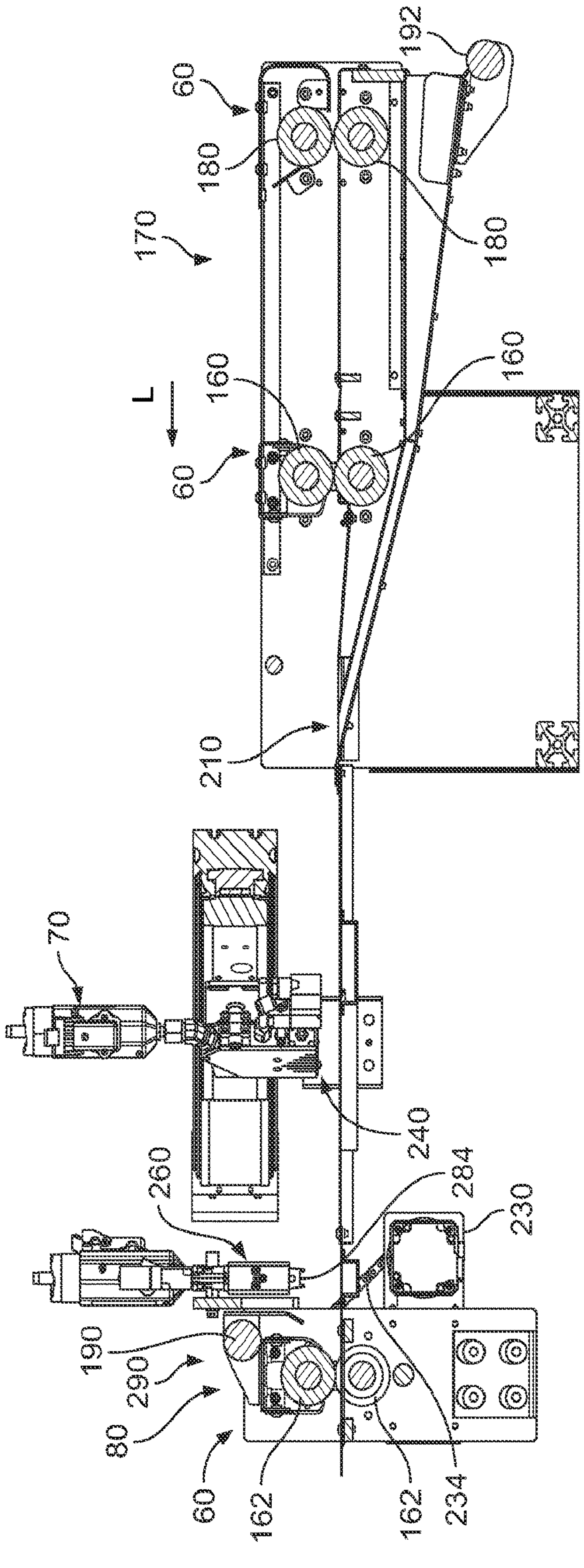
FIG. 3A is a side elevational view of the feeder, the cross adhesive applicator, the side adhesive applicator, the expander, and a layering device portions of the apparatus of FIG. 1.
Figure 3B:
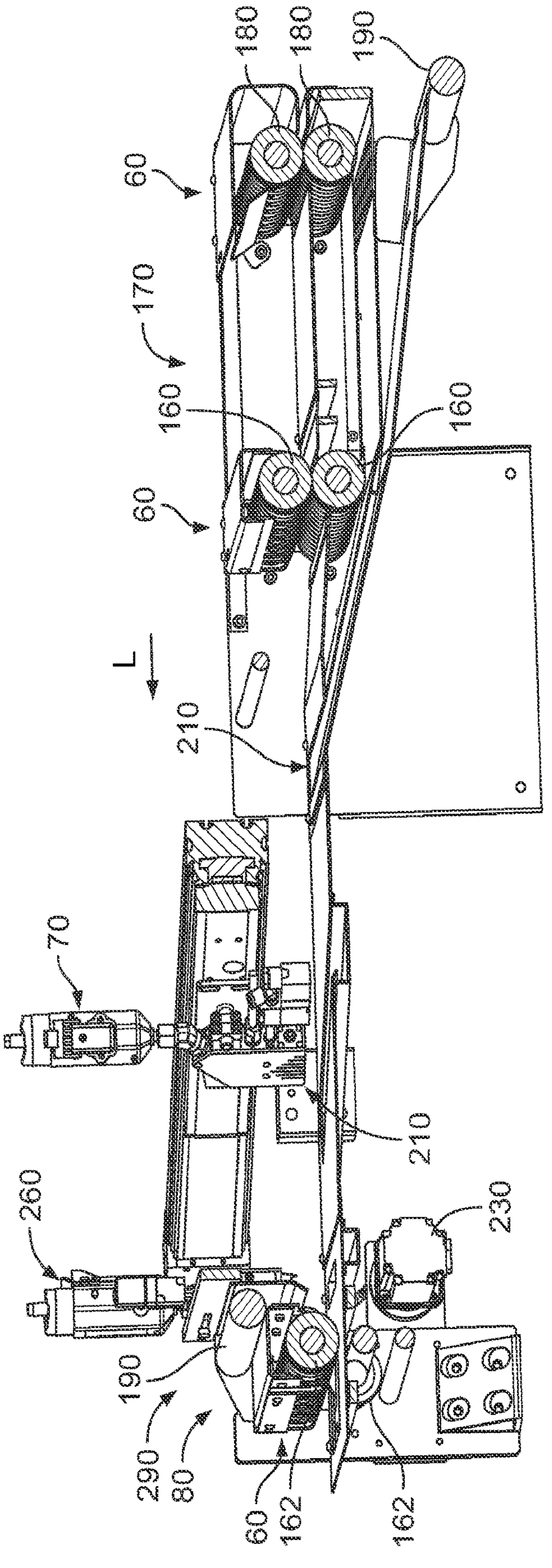
FIG. 3B is a side cross sectional perspective view of the feeder, the cross adhesive applicator, the side adhesive applicator, the expander, and the layering device portions of the apparatus of FIG. 1.
Figure 4:
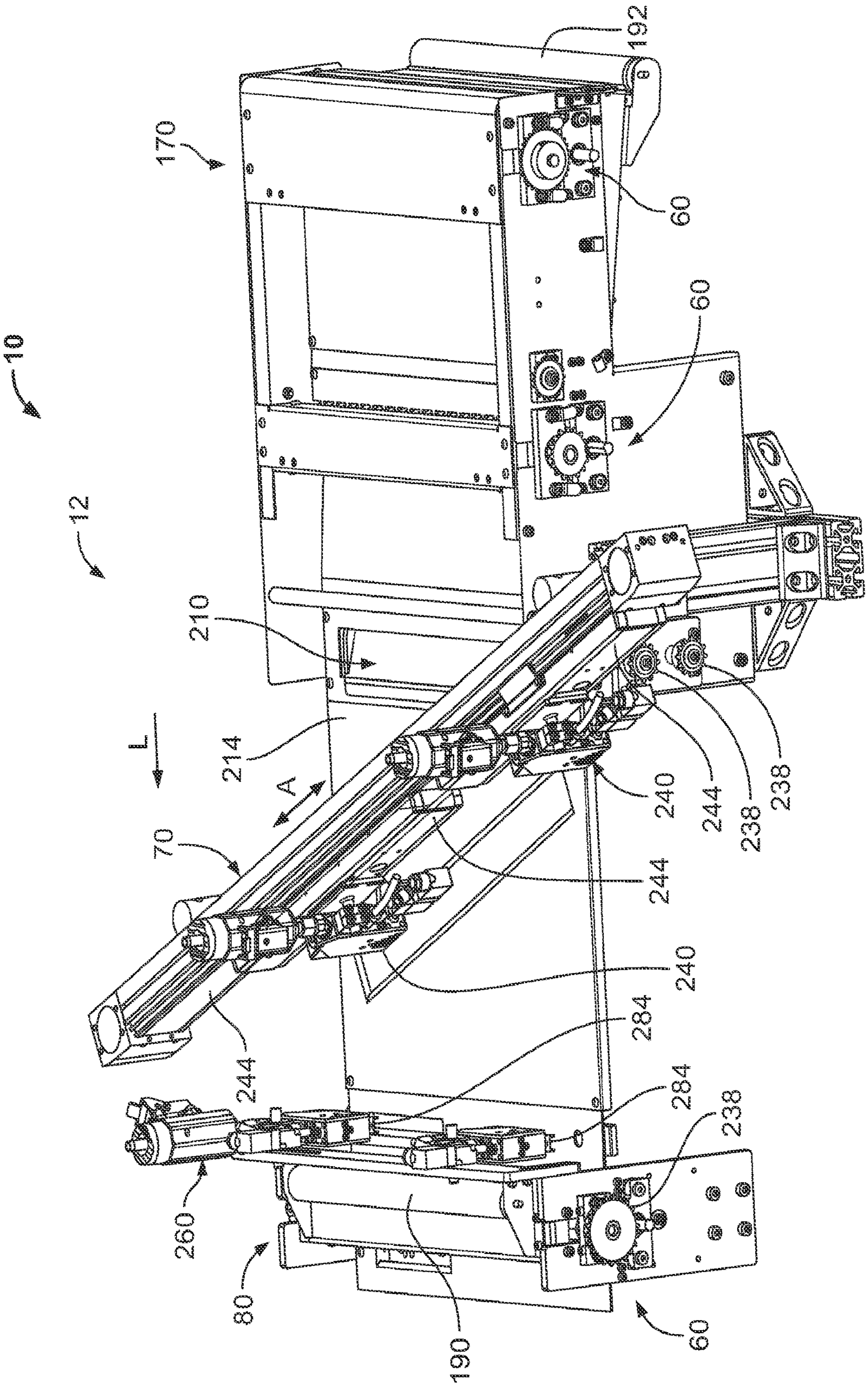
FIG. 4 is an enlarged perspective view of the feeder, the cross adhesive applicator, the side adhesive applicator, and the layering device portions of the apparatus of FIG. 1.

Referring to FIGS. 1 and 2, the spindles 140, 176 for the respective rolls 130, 174 of sheet material 20, 172 are suspended above the three sets of rollers 160, 162, 180 and the spindle 142 for the roll 132 of lower cover sheet material 22 is disposed below the three sets of rollers 160, 162, 180. As shown in FIGS. 2-4, the illustrative feeder 60 includes an upper cover sheet material guide roller 190 and a lower cover sheet material guide roller 192 that guide the respective upper and lower cover sheet materials 20, 22 to the second set of rollers 162. The upper cover sheet material guide roller 190 is rotatably mounted to the frame 150 and located between the roll 130 and the second set of rollers 162. The lower cover sheet material guide roller 192 is rotatably mounted to the frame 150 and located underneath the expander 170. The lower cover sheet material 22 is also guided through an accessway or opening 210 in a wall 214 disposed between the upstream end of the cross adhesive applicator 70 and the downstream end of the expander 170.

As shown in FIGS. 1, 3A, 3B and 4, the feeder 60 includes a motive device to drive the various pairs of rollers 160, 162, and 180, such as a drive motor 230, for example a servo drive motor. In the illustrated embodiment the drive motor 230 is mechanically linked to the second set of rollers 162 by a drive chain 234 and mechanically linked to the first set of rollers 160 by an intermediate drive chain 236 trained around intermediate sprockets 238. Thus, a single drive motor 230 is controlled to feed the sheet materials 20, 22, 24 through the dunnage converter apparatus 12. In the illustrative embodiment, the first and second sets of rollers 160, 162 are also mechanically linked to the upstream set of rollers 180 of the expander 170 by a not shown drive chain. The drive motor 230 is configured to selectively rotate and stop rotating each set of rollers 160, 162, 180. Alternatively, each set of rollers 160, 162, and 180 in the feeder 60 may be driven by separate motors or a combination of two of the rollers 160, 162, and 180 may be driven by a common motor and the other of the rollers 160, 162, and 180 may be driven by a separate motor.

As shown in FIGS. 1-5, downstream of the expander 170, the feeder 60 advances the lower cover sheet material 22 and the expanded slit-sheet material 24 through the cross adhesive applicator 70. The illustrated cross adhesive applicator 70 is configured to apply first and second beads of adhesive 76, 78 across the upper surface 22U of the lower cover sheet material 22 and overlapping expanded slit-sheet material 24. As will be appreciated, to reach the lower cover sheet material 22 the adhesive 76, 78 passes through the slits in the expanded slit-sheet material 24 that is on top of the lower cover sheet material 22. The adhesive 76, 78 can be any adhesive suitable for bonding the sheet materials 20, 22, 24 and passing easily through the opened slits in the expanded slit-sheet material 24, for example, a hot glue adhesive.

The cross adhesive applicator 70 is configured to apply the first and second beads of adhesive 76, 78 across and through the expanded slit-sheet material 24 and across the upper surface 22U of the lower cover sheet material 22 as the expanded slit-sheet material 24 and the lower cover sheet material 22 are fed through the dunnage conversion apparatus 12 by the feeder 60. As such, the first and second beads of adhesive 76, 78 can be applied without stopping the feeder 60 and/or the cross adhesive applicator 70.

The cross adhesive applicator 70 has an adhesive head 240, in the illustrated embodiment a hot glue head, configured to move across the lower cover sheet material 22 in a direction transverse to the longitudinal direction L. In one form, the adhesive head 240 may be activated by means of a pneumatic solenoid valve integrated in the structure of the adhesive heads 240. The adhesive head 240 has a split nozzle to apply the first and second beads of adhesive 76, 78 across the upper surface 22U of the lower cover sheet material 22, where the first bead of adhesive 76 is spaced apart from the second bead of adhesive 78 in the longitudinal direction L. Alternatively, the cross adhesive applicator 70 may include a spray nozzle configured to spray a single wide bead of adhesive sufficient to seal the leading end 30C and the trailing end 30D in the same manner as the separate first and second beads of adhesive 76, 78.

As will be described in greater detail below, the first bead of adhesive 76 seals the layers at the trailing end 30D of one longitudinal strip of expanded dunnage 30 and the second bead of adhesive 78 seals the layers at the leading end 30C of a successive longitudinal strip of expanded dunnage 30. As shown in FIG. 4, a linear actuator 244 translates the adhesive head 240 across the lower cover sheet material 22 along a linear path A at a non-perpendicular angle relative to the longitudinal direction L. The linear actuator 244 is disposed above the feed path of the lower cover sheet material 22 at a sufficient height to allow passage of both the lower cover sheet material 22 supplied by the roll 132 and the expanded slit-sheet material 24 thereon supplied by the expander 170. In one form, the linear actuator 244 is driven by a servo motor and may travel up to approximately 60 inches per second.

Figure 5A:
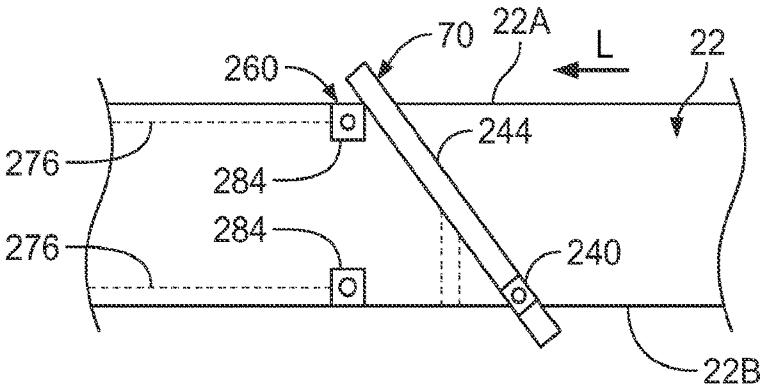
FIGS. 5A-5D illustrates in sequence how from earliest in time to latest in time, respectively, the apparatus applies adhesive across an upper surface of a lower cover sheet material in a direction perpendicular to parallel opposite sides of the lower cover sheet material, and at the upper surface of the lower cover sheet material at opposite sides of the lower cover sheet material in a direction in which the sheet material is being fed.
Figure 5B:
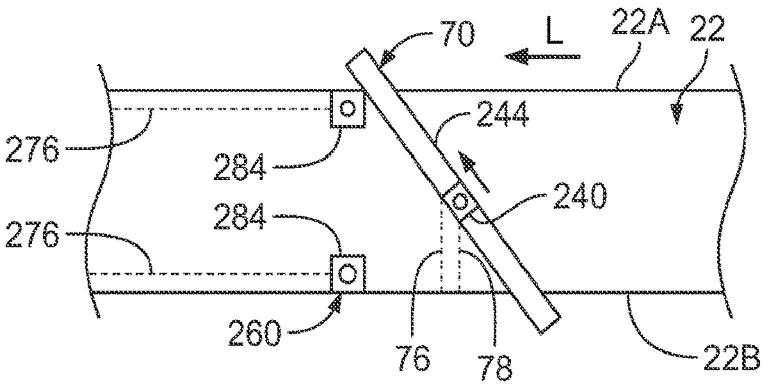
Figure 5C:
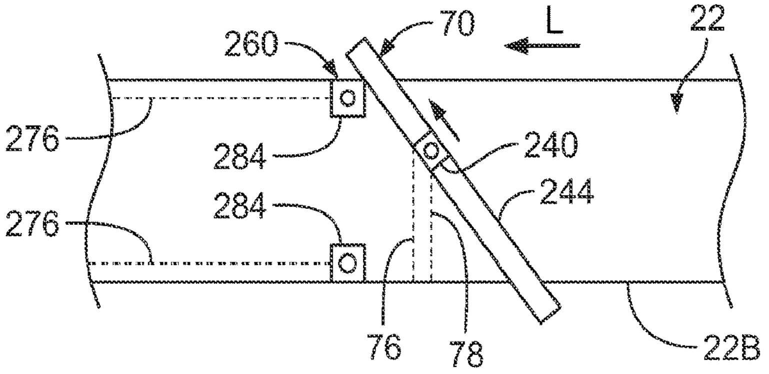

The angled nature of the path A allows the speed of the translation of the adhesive head 240 to be controlled based on the speed of the lower cover sheet material 22 provided by the feeder 60 to deposit adhesive along a line that is perpendicular to the longitudinal direction L. FIGS. 5A-5D show the first and second beads of adhesive 76, 78 being applied across the upper surface 22U of the lower cover sheet material 22, the expanded slit-sheet material 24 being omitted from view to enable a clearer view of the adhesive 76, 78. In FIGS. 5A-5D, the sequence of figures from the top figure, FIG. 5A, to the bottom figure, FIG. 5B, represents, respectively, the earliest in time to the latest in time of the feeder 60 feeding the lower cover sheet material 22 through the dunnage conversion apparatus 12 as the linear actuator 244 translates the adhesive head 240 across the lower cover sheet material 22. Referring to FIGS. 5A-5D and 9, the feeder 60 and the cross adhesive applicator 70 operate simultaneously, that is without stoppage, to apply the adhesive 76, 78 to the lower cover sheet material 22 in a direction perpendicular to the longitudinal direction L and the parallel opposite side edges 22A, 22B of the lower cover sheet material 22.

As shown in FIGS. 1-6, adjacent the cross adhesive applicator 70 the dunnage conversion apparatus 12 also includes a side adhesive applicator 260 configured to apply a bead of adhesive 276 to an upper surface 22U of the lower cover sheet material 22 adjacent one longitudinal side edge 22A of the lower cover sheet material 22 and a bead of adhesive 276 adjacent an opposite longitudinal side edge 22B of the lower cover sheet material 22. As with the cross-adhesive, any adhesive applied to the expanded slit-sheet material 24 will pass through the opened slits to reach the lower cover sheet material 22. If the expanded slit-sheet material 24 has a narrower width than the upper and lower sheet materials 20, 22, the adhesive 276 applied by the side adhesive applicator 260 will be applied directly to the lower cover sheet material 22, that is, without having to pass through the slits in the expanded slit-sheet material 24. The adhesive 276 can be any adhesive suitable for bonding the sheet materials 20, 22, 24, and passing easily through the opened slits if necessary, such as a hot glue adhesive.

The side adhesive applicator 260 has two adhesive heads 284, in the illustrated embodiment two hot glue heads, respectively mounted to the frame 150 at opposite sides of the lower cover sheet material 22 above the feed path of the lower cover sheet material 22 at a sufficient height to allow passage of both the lower cover sheet material 22 supplied by the roll 132 and the expanded slit-sheet material 24 thereon supplied by the expander 170. In one form, the adhesive heads 284 may be activated by means of respective pneumatic solenoid valves integrated in the structure of the adhesive heads 284. One adhesive head 284 applies a bead of adhesive 276 adjacent one longitudinal side edge 22A of the lower cover sheet material 22, and the other, opposite, side adhesive head 284 applies a bead of adhesive 276 adjacent the opposite longitudinal side edge 22B of the lower cover sheet material 22.

Figure 5D:
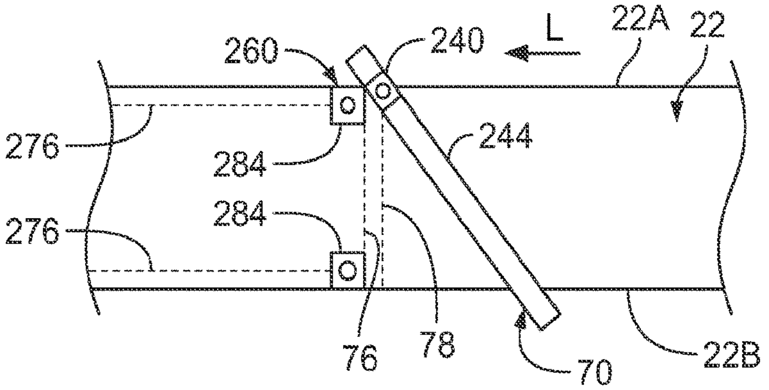
Figure 6:
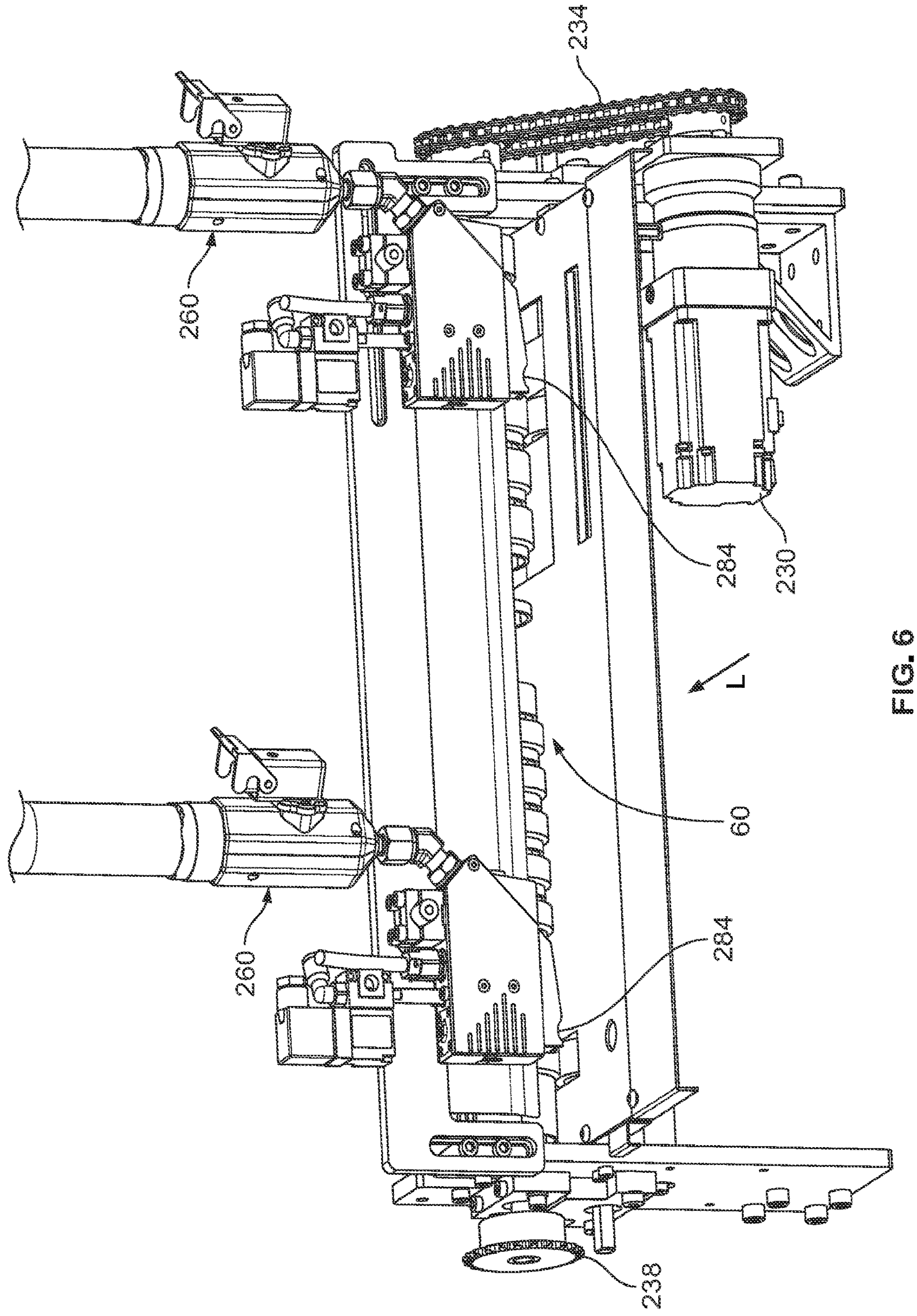
FIG. 6 is an enlarged perspective view of the side adhesive applicator portion of the apparatus of FIG. 1.

Referring again to FIGS. 5A-5D, the beads of adhesive 276 are shown applied to the opposite longitudinal side edges 22A, 22B of the lower cover sheet material 22 on the upper surface 22U thereof, the expanded slit-sheet material 24 being omitted from view to enable a clearer view of the adhesive 276. In FIGS. 5A-5D, the sequence of figures from the top figure, FIG. 5A, to the bottom figure, FIG. 5D, represents, respectively, the earliest in time to the latest in time of the feeder 60 feeding the lower cover sheet material 22 through the dunnage conversion apparatus 12 as the adhesive heads 284 apply the adhesive 276 to the lower cover sheet material 22. Referring to FIGS. 5A-5D and 9, the feeder 60 and the side adhesive applicator 260 operate simultaneously, that is without stoppage, to apply the adhesive 276 to the lower cover sheet material 22 at the opposite longitudinal side edges 22A, 22B of the lower cover sheet material 22. Alternatively, the side adhesive applicator 260 could be configured to apply adhesive to a lower surface 20L of the upper cover sheet material 20 at the opposite longitudinal side edges 20A, 20B of the upper cover sheet material 20.

As shown in FIGS. 1, 3A, 3B and 9, once the adhesive is applied by the cross adhesive applicator 70 and the side adhesive applicator 260 the feeder 60 feeds the lower cover sheet material 22 and the expanded slit-sheet material 24 to the layering device 80 for combination with the upper cover sheet material 20. In the illustrative embodiment, the layering device 80 includes the second set of rollers 162 that are also part of the feeder 60. The second set of rollers 162 draw the upper cover sheet material 20 from the roll 130, over the upper cover sheet material guide roller 190, and compresses the upper cover sheet material 20 and the lower cover sheet material 22 along the lines of adhesive deposited by the side adhesive applicator 260 to bond the upper cover sheet material 20 and the lower cover sheet material 22 together with the expanded slit sheet material 24 therebetween. In their capacity as the layering device 80, the second set of rollers 162 layer the upper cover sheet material 20 upon the upper surface 22U of the lower cover sheet material 22 with the expanded slit-sheet material 24 therebetween. The rollers 162 thus not only aid the feeder 60 in feeding the sheet materials 20, 22, 24 through the dunnage conversion apparatus 12 as part of the feeder 60 but also layer the sheet materials 20, 22, 24 and press them together to form the layered strip of dunnage 86.

The second set of rollers 162 not only function as part of the feeder 60 and the layering device 80, but also act as a side pressure applicator 290. As shown in FIGS. 1, 3A, 3B and 9, the side pressure applicator 290 is configured to apply a pressure to the layered product 86 at the location of the adhesive 276 applied to the opposite side edges 22A, 22B of the lower cover sheet material 22 to bond the lower surface 20L of the upper cover sheet material 20 to the upper surface 22U of the lower cover sheet material 22. The side pressure applicator 290 is configured to apply the pressure to the layered product 86 as the feeder 60 feeds the upper cover sheet material 20, the lower cover sheet material 22 and the expanded slit-sheet material 24 through the dunnage conversion apparatus 12.

In the illustrated embodiment, like the afore described layering device 80, the side pressure applicator 290 is made up of the second set of rollers 162. In their capacity as the side pressure applicator 290, the rollers 162 function as first and second pairs of upper and lower bonding rollers at respective opposite sides of the layered product 86, the upper bonding rollers and the lower bonding rollers being configured to pinch the opposite sides of the layered product 86 as the layered product 86 passes between the upper bonding rollers and the lower bonding rollers. The rollers 162 thus not only aid the feeder 60 in feeding the sheet materials 20, 22, 24 through the dunnage conversion apparatus 12 but also apply pressure to the sheet materials 20, 22, 24 at the locations of the side beads of adhesive 276 to compress and thereby seal together the opposite side edges 20A, 20B of the upper cover sheet material 20 to the respective opposite side edges 22A, 22B of the lower cover sheet material 22 with the respective opposite side edges 24A, 24B of the expanded slit-sheet material 24 pinched therebetween to form the layered product 86.

Alternatively, if the expanded slit-sheet material 24 is narrower than the spacing between the opposite side beads of adhesive 276, the side edges 20A, 20B of the upper cover sheet material 20 may be directly bonded to respective side edges 22A, 22B of the lower cover sheet material 22. The expanded slit-sheet material 24 would still be captured between the upper cover sheet material 20 and the lower cover sheet material 22, but the side edges 24A, 24B of the expanded slit-sheet material 24 would not be pinched between the side edges 20A, 20B of the upper cover sheet material 20 and respective side edges 22A, 22B of the lower cover sheet material 22.

In the illustrated embodiment, the second set of rollers 162 perform multiple functions, including feeding the lower cover sheet material 22 and the expanded slit-sheet material 24, drawing the upper cover sheet material 20 from its roll 130, layering the upper cover sheet material 20 over the expanded slit-sheet sheet material 24 and lower cover sheet material 22, and pressing the sheet materials 20, 22, 24 at the side beads of adhesive 276 to bond the upper cover sheet material 20 to the lower cover sheet material 22. It will be appreciated that each of these functions, while provided by a common set of rollers 162 in the illustrated embodiment, may be provided by separate sets of driven rollers in alternative embodiments.

Adjacent the side pressure applicator 290, the layered product 86 also is sealed along the perpendicular beads of adhesive 76, 78 deposited by the cross adhesive applicator 70 by the cross pressure applicator 90. The cross pressure applicator 90 is shown in FIGS. 1 and 7-9. The cross pressure applicator 90 is configured to apply pressure to the layered product 86 as the upper cover sheet material 20, the lower cover sheet material 22, and the expanded slit-sheet material 24 are fed through the dunnage conversion apparatus 12. In the illustrative embodiment, the cross pressure applicator 90 includes a cammed roller 300 extending across the layered product 86 and configured, when rotated, to compress the layered product 86 at the location of the longitudinally spaced first and second beads of adhesive 76, 78 applied across the upper surface 22U of the lower cover sheet material 22. The pressure applied by the cammed roller 300 to the areas of the first and second beads of adhesive 76, 78 functions to mechanically seal, respectively, the trailing end 30D of one strip of expanded dunnage 30 and the leading end 30C of a successive strip of expanded dunnage 30. The cammed roller 300 may also be configured to crush the strip of expanded dunnage 30 at locations where a fold is to be provided, for example in the flap area to reduce the total thickness when the flap is folded over to close the pouch package, or other locations to reduce the thickness of the strip of expanded dunnage 30.

Figure 7:
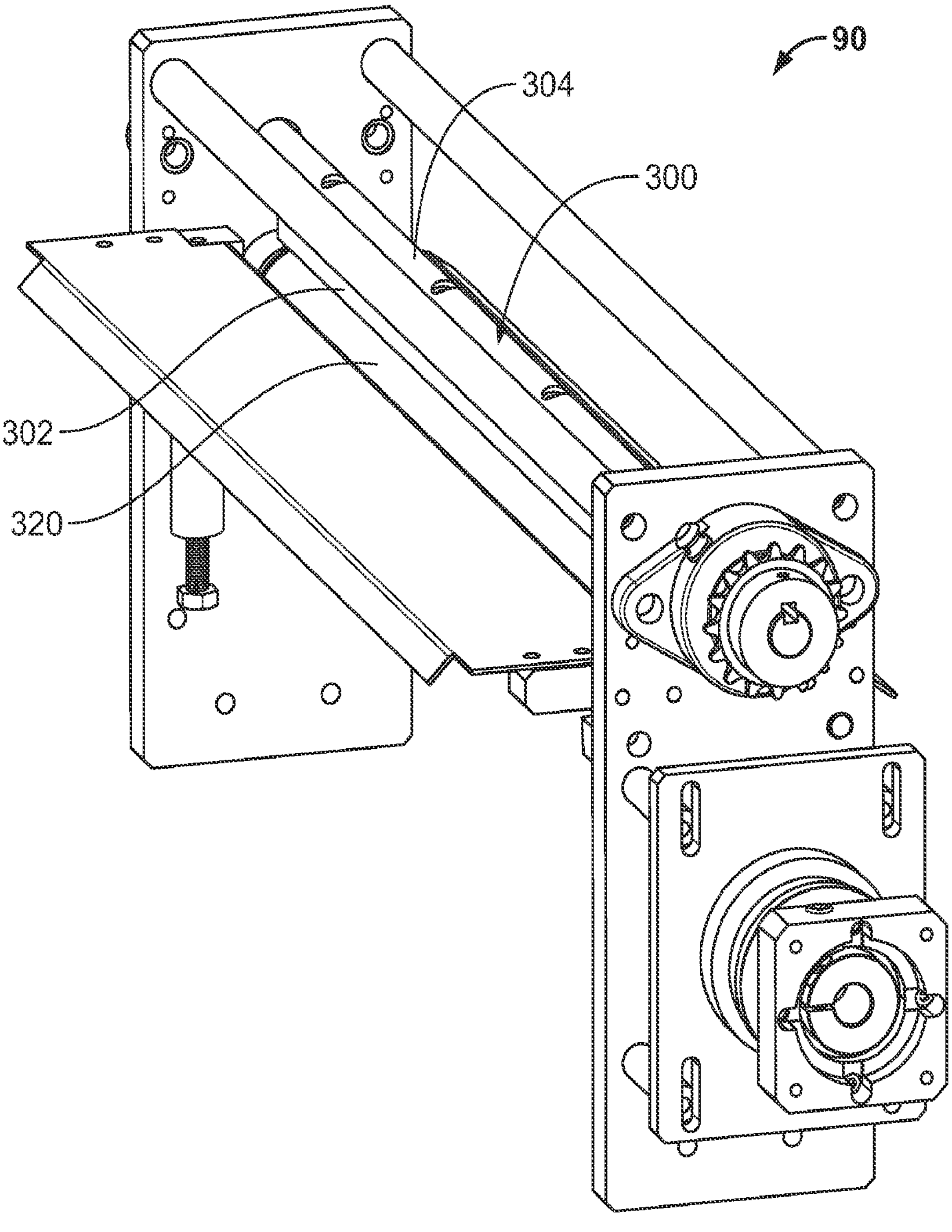
FIG. 7 is an enlarged perspective view of a cross pressure applicator portion of the apparatus of FIG. 1.
Figure 8:
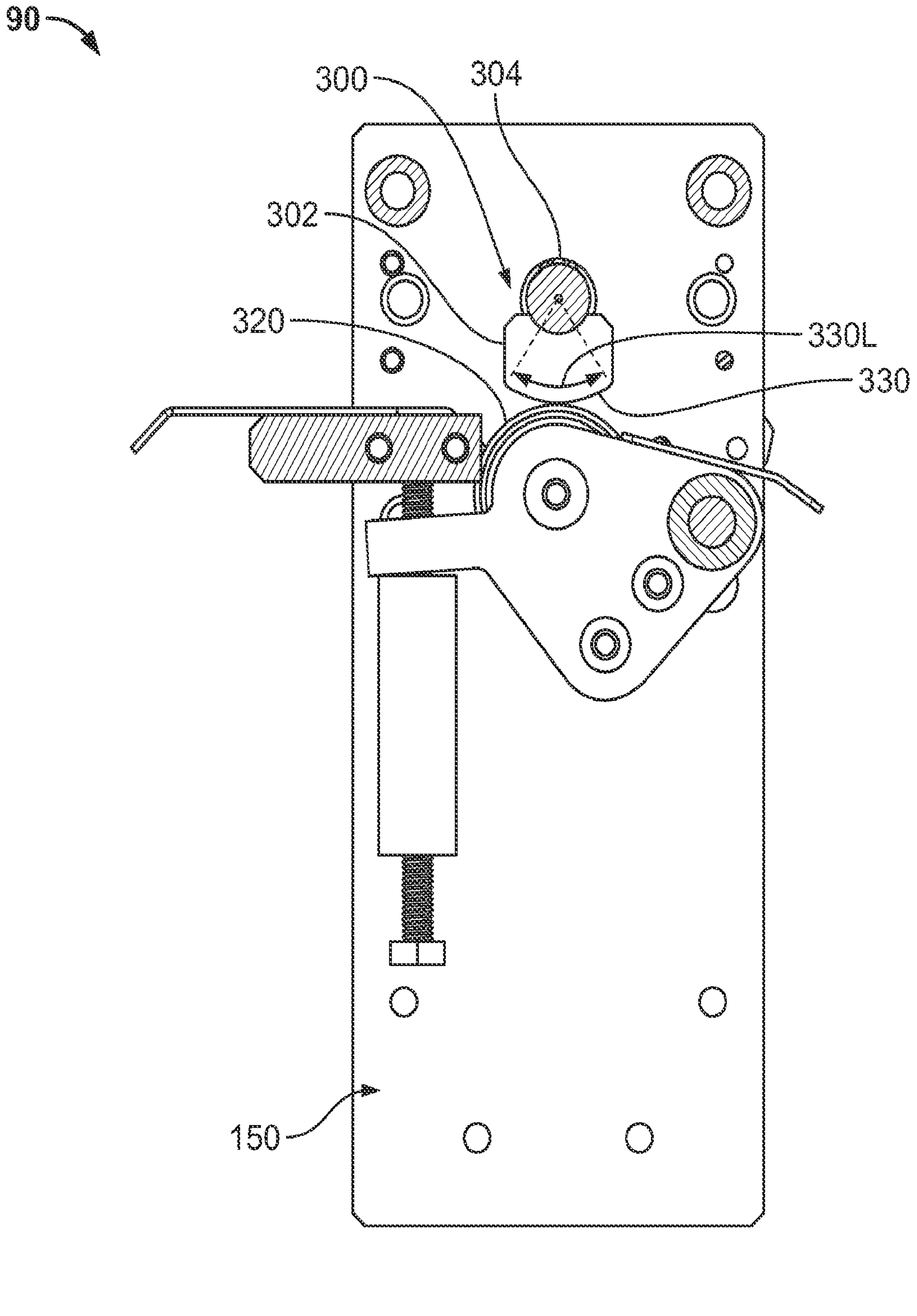
FIG. 8 is a side elevational view of the cross pressure applicator portion of the apparatus of FIG. 7.

As shown in FIGS. 7 and 8, the cammed roller 300 includes a cam 302 connected to a roller 304 along the length of the roller 304. The roller 304 is rotatably mounted at its opposite ends to the frame 150 of the dunnage conversion apparatus 12. A drive motor (not shown), for example a servo drive motor, is mounted to the frame 150 and coupled to the roller 304 to rotate the roller 304 and hence the cammed roller 300. As will be appreciated, as the roller 304 rotates (clockwise in FIG. 8), the cam 302 will cooperate with a sliding surface 320, in the illustrated embodiment a conforming roller 320 on the opposite side of, that is below, the layered product 86, to press or crush the layered product 86 therebetween. The cam 302 includes an arc shape bearing portion 330 that has an arc shape length 330L that is at least as long as the longitudinal space between the first and second beads of adhesive 76, 78 and the longitudinal span of each bead of adhesive 76, 78. In this way, the arc shape bearing portion 330 and the sliding surface 320 press the layered product 86 only at the locations of the first and second beads of adhesive 76, 78.

As will be appreciated, in applications where the flap area is to be crushed to reduce the thickness of the flap area, the arc shape length 330L of the arc shape bearing portion 330 can be increased accordingly. Also, in an alternative embodiment, the cam may be omitted and the roller 304 may be configured to be vertically adjustable, that is, to move up and down, and either roll the entire thickness in the up position or crush in the down position. Alternatively, or additionally, crush rollers can be added to the front of the enveloping apparatus 40 or at the feeder 60. To reduce the pouch package thickness, the crush gap can be made adjustable. As will be appreciated, these alternatives can facilitate the making of an adjustable thickness pouch package.

Figure 9:
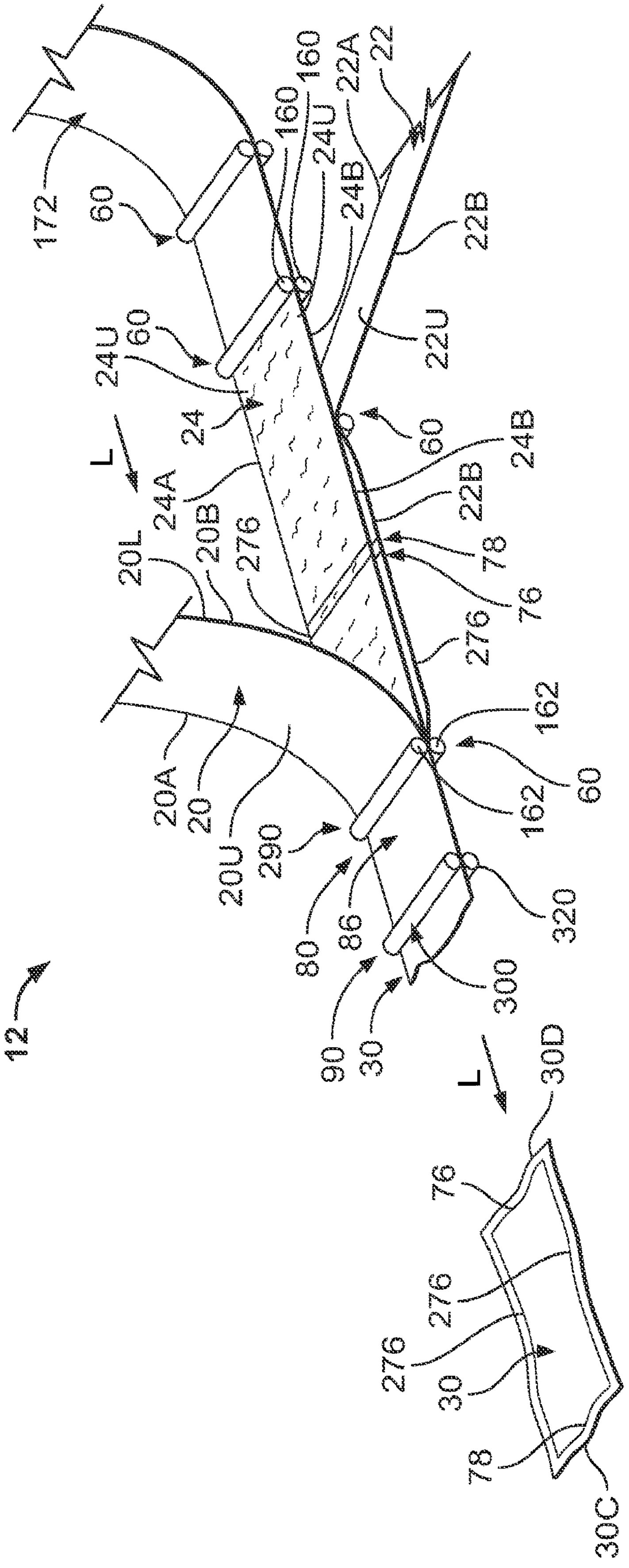
FIG. 9 shows an upper cover sheet material, a lower cover sheet material and an expanded slit-sheet material converted into a longitudinal strip of expanded dunnage by the apparatus of FIG. 1.

Referring to FIG. 9, the cammed roller 300 applies the pressure to the layered product 86 simultaneously as the feeder 60 feeds the sheet materials 20, 22, 24, that is without stoppage of either the cammed roller 300 or the feeder 60. In one form, the cammed roller 300 is configured to make one complete rotation per one longitudinal strip of expanded dunnage 30. The cross pressure applicator 90 is not limited to the illustrated cammed roller 300 arrangement but may include other devices for pressing the upper cover sheet material 20, the expanded slit-sheet material 24, and the lower cover sheet material 22 together at the first and second beads of adhesive 76 and 78 to bond the layers of the layered product 86 together. For example, any portions of the expanded slit-sheet material 24 compressed by either the side pressure applicator 290 or the cross pressure applicator 90 will have a reduced thickness and thus will provide less cushioning at those locations.

Figure 10:
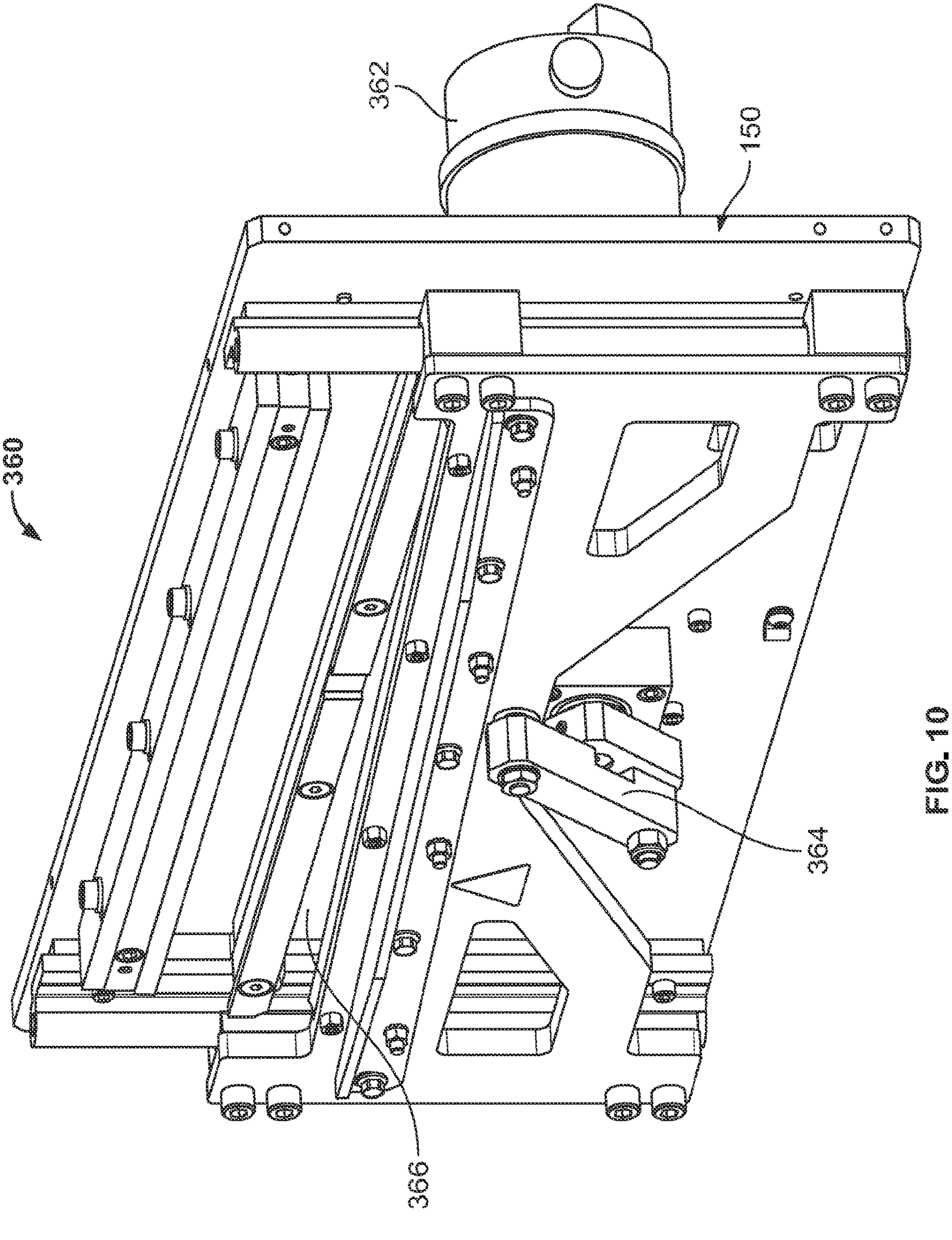
FIG. 10 is an enlarged perspective view of a cutter portion of the apparatus of FIG. 1.

The layered product 86 is severed, such as by cutting, between the first and second beads of adhesive 76 and 78 to separate a finished strip of expanded dunnage from the layered product 86. FIG. 10 shows a cutter 360 that is configured to cut the layered product 86 in a direction perpendicular to the longitudinal direction L and between the first and second beads of adhesive 76, 78 sealed by the cross pressure applicator 90. The illustrated cutter 360 includes a motor 362 and linkage 364 that drive a blade 366 downward to cut the layered product 86 to form the discrete strip of expanded dunnage 30 and then upward to retract the blade 366 to allow passage of the layered product 86 that will form a subsequent strip of expanded dunnage 30. The motor 362 may be any suitable motor, for example, a 48 VDC motor. The motor 362 makes one complete rotation in cutting the layered product 86 and returning the blade 366 to its retracted, or home, position.

The cutter 360 is equipped with a home sensor to confirm the blade has returned to its retracted position. The cutter 360 may be configured to cut the layered product 86 on-the-fly, that is simultaneously as the feeder 60 and cross pressure applicator 90 are in operation. For example, the illustrated cutter 360 may translate longitudinally at the same speed as the layered product 86 to cut without stopping movement of the layered product 86, or the cutter 360 may be formed by a rotating element with a cutting blade 366. Alternatively, the feeder 60 and cross pressure applicator 90 may be stopped or temporarily paused as the cutter 360 cuts the layered product 86. The bottom left of FIG. 9 shows the layered product 86 cut in two places by respective repeated cutting actions of the cutter 360, resulting in a strip of expanded dunnage 30 having respective leading and trailing ends 30C, 30D.

The resulting strip of expanded dunnage 30 is provided to the enveloping apparatus 40 to fold the strip of expanded dunnage 30 into a pouch package. Turning again to FIG. 1, the enveloping apparatus 40 for making the pouch package 50 from the strip of expanded dunnage 30 includes the folding device 120. The folding device 120 is disposed downstream in the longitudinal direction L from the dunnage conversion apparatus 12. Depending on the length of the strip of expanded dunnage 30, the folding device 120 may be close enough to the cutter 360 that the folding device 120 receives the leading end 30C of the strip 30 before the cutter 360 cuts the strip 30 to form the trailing end 30D of the strip of expanded dunnage 30. Thus, at least a portion of the length of the strip 30 may be engaged by the folding device 120 before the trailing end 30D of the strip of expanded dunnage 30 is formed by the cutting action of the cutter 360.

In another embodiment, for example, the dunnage conversion apparatus 12 is omitted or located remotely, and the strip of expanded dunnage 30 is manually fed into the enveloping apparatus 40 or fed from a cartridge capable of delivering multiple strips of expanded dunnage 30 automatically. Additionally or alternatively, the folding device 120 may be spaced further in the downstream or longitudinal direction L from the cutter 360 so that the leading end 30C of the strip of expanded dunnage 30 does not reach the folding device 120 until after the strip 30 leaves the cutter 360.

Figure 11:
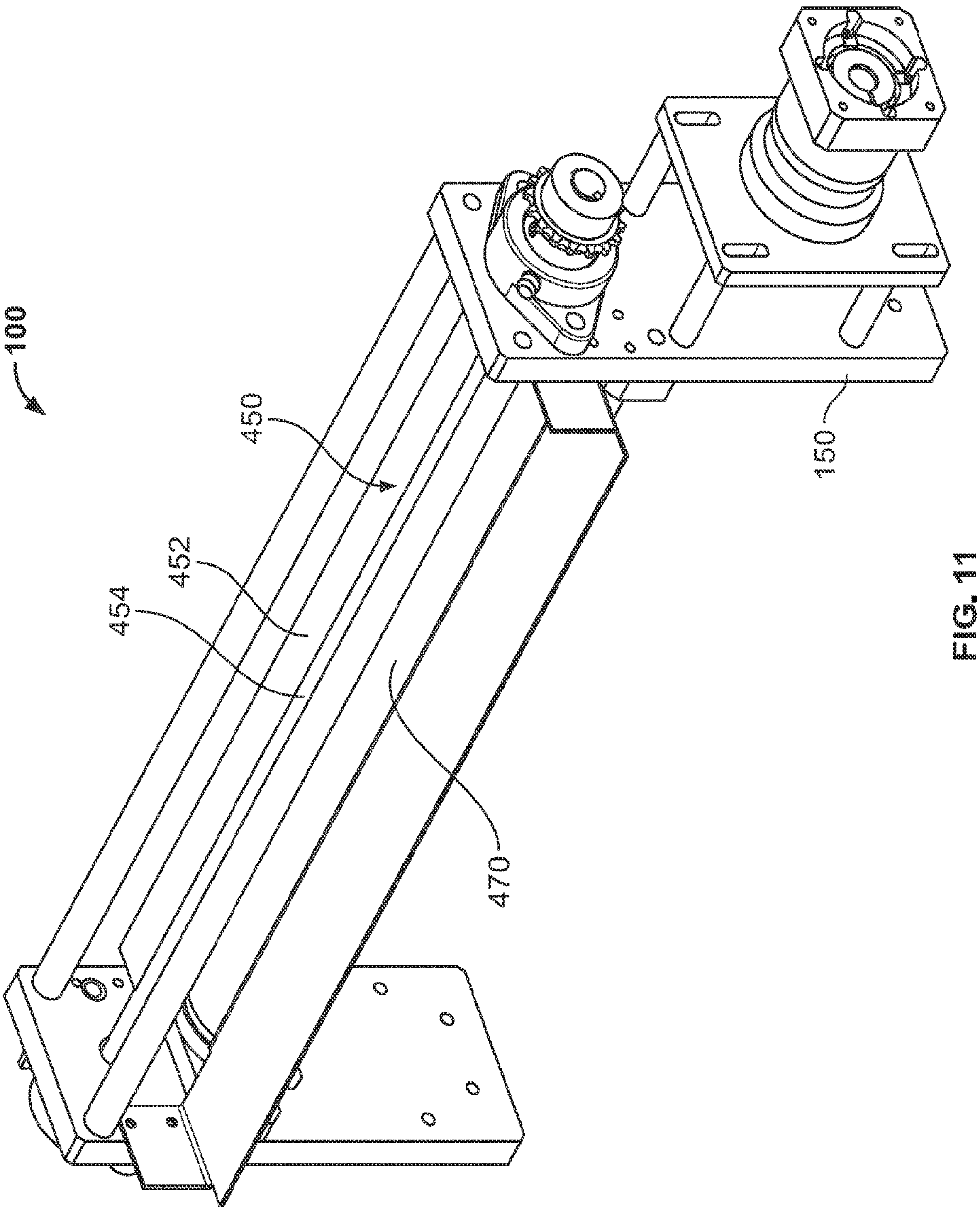
FIG. 11 is an enlarged perspective view of the creaser portion of the apparatus of FIG. 1.
Figure 12:
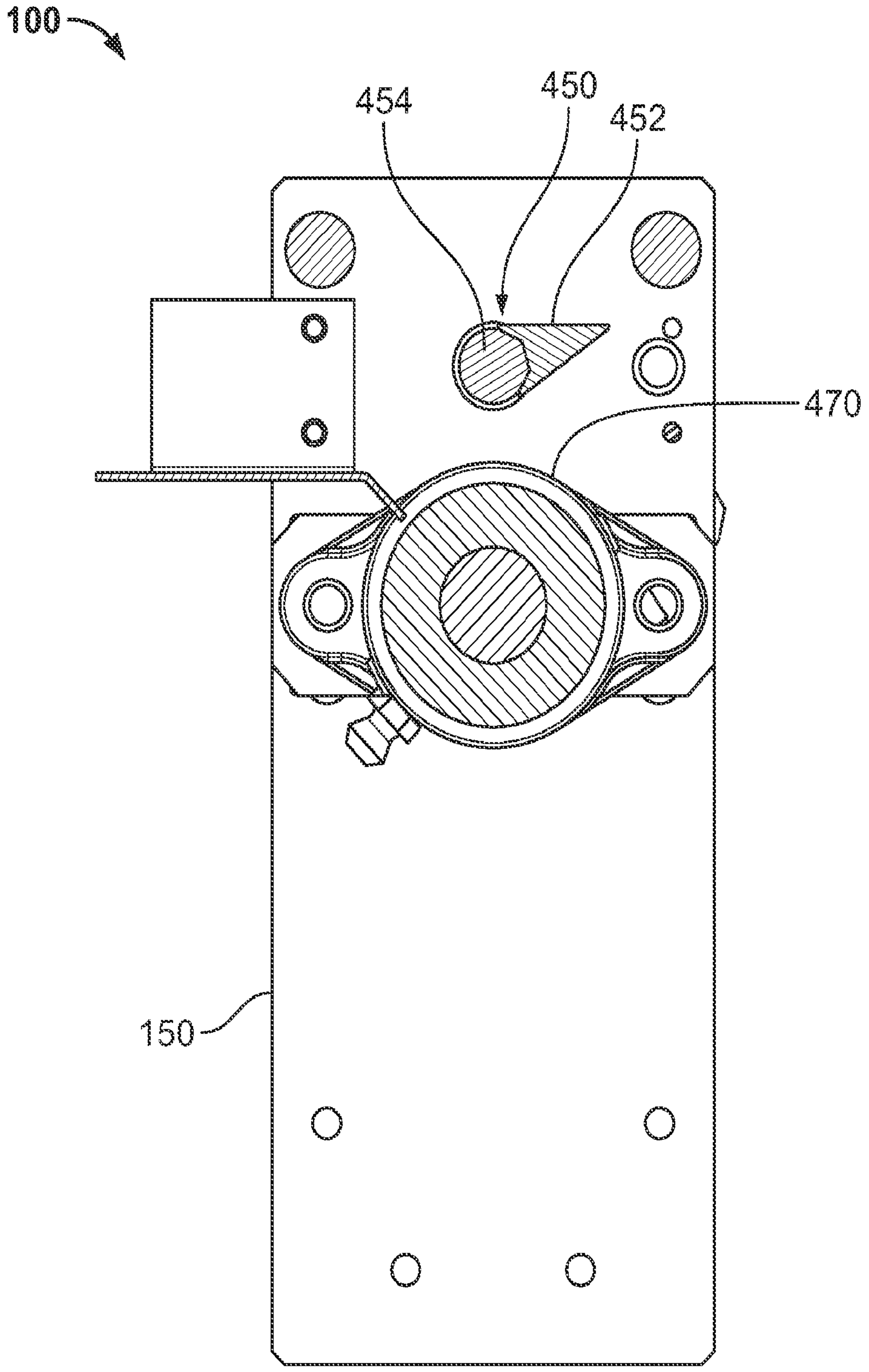
FIG. 12 is a side elevational view of the creaser portion of the apparatus of FIG. 11.

While the leading end 30C of the strip of expanded dunnage 30 may enter the folding device 120, it is not yet ready to be folded. To facilitate the folding, the creaser 100 imparts a crease in the strip of expanded dunnage. The creaser 100 is shown in FIGS. 11 and 12. In the illustrated embodiment the creaser 100 is configured to crease the strip 30 with two creases, the afore described cross-wise extending crease 106 and a second cross-wise extending crease 406 longitudinally spaced from the cross-wise extending crease 106. Alternatively, two separate devices may form the first and second cross-wise extending creases 106 and 406.

Figure 16:
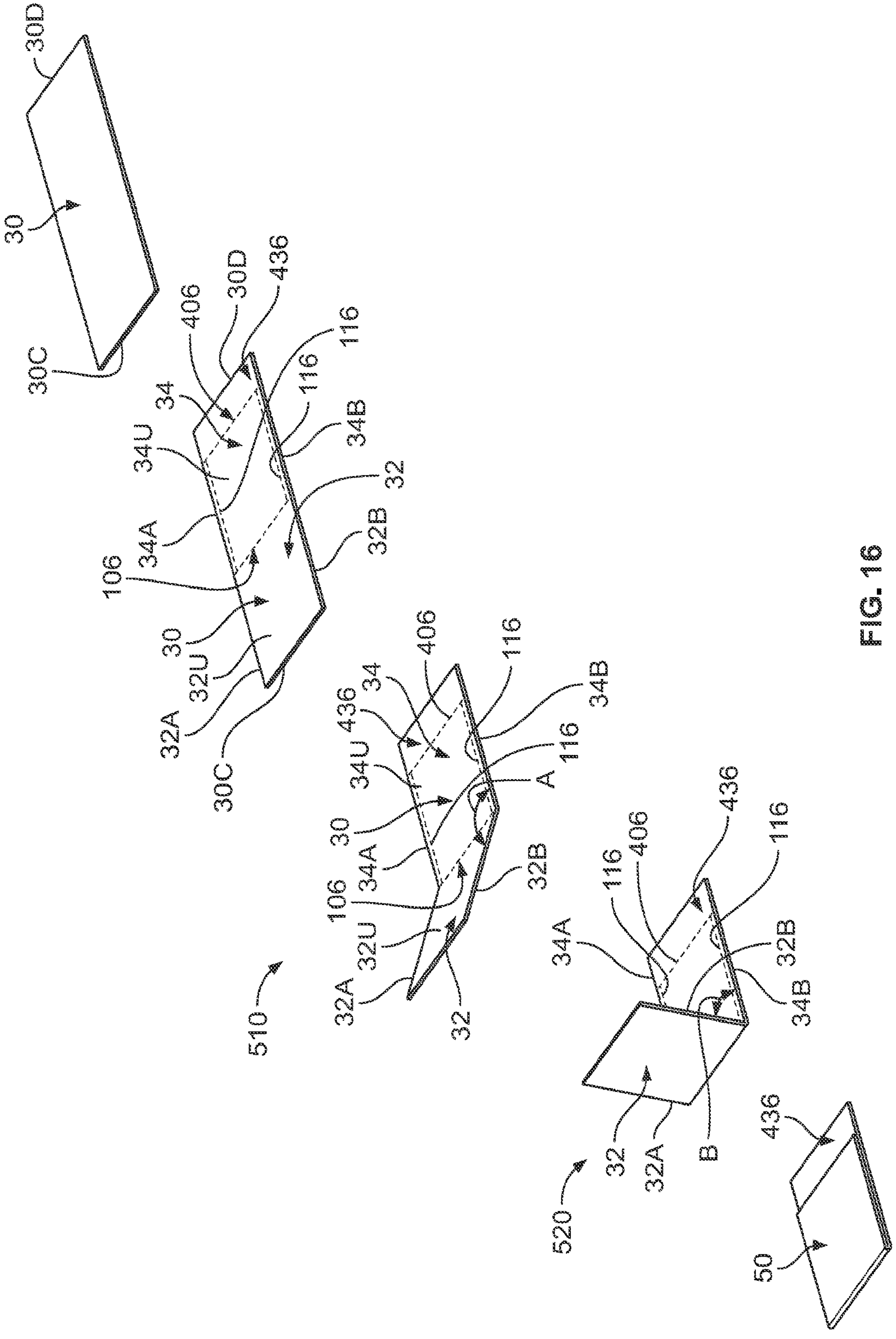
FIG. 16 illustrates steps in the process of a longitudinal strip of the expanded dunnage being made into a pouch package by the apparatus of FIG. 1.

The enveloping process, including the creasing, is illustrated in FIG. 16, in which a sequence of figures, from the top figure to the bottom figure, represents, respectively, the earliest in time to the latest in time of the enveloping apparatus 40 feeding the strip 30 therethrough to make the pouch package 50. The creaser 100 forms in sequence the first cross-wise extending crease 106 and then the second cross-wise extending crease 406. The creaser 100 forms the first cross-wise extending crease 106 to extend across the width of the strip 30 at a location longitudinally between the leading and trailing ends 30C, 30D of the strip 30, thereby to form the aforementioned first strip portion 32 and second strip portion 34 on longitudinally opposite sides of the cross-wise extending crease 106.

The creaser 100 forms the second cross-wise extending strip 406 to extend across the width of the strip 30 at a location longitudinally spaced from the first cross-wise extending crease 106 a distance equal to the length of the first strip portion 32, resulting in dividing the second strip portion 34 into a shortened second strip portion 34 and a third strip portion 436 or flap 436. As such, and as shown in FIG. 16, the length of the first strip portion 32 is equal to the length of the shortened second strip portion 34. As will be described in greater detail below, the cross-wise extending crease 106 aids the folding device 120 in folding the strip 30 upon itself shortly after adhesive is applied to form a pouch portion of the pouch package 50. The second cross-wise extending crease 406 provides, once the pouch package 50 is formed, a fold location about which the flap 436 may be folded to close the pouch package 50. While an envelope-like pouch package 50 is likely to be a common configuration, the pouch package 50 also may have a relatively shorter pouch and a relatively longer flap such that the flap could be wrapped around the pouch to provide additional cushioning.

Thus, the creaser 100 is configured to impart the first and second cross-wise extending creases 106, 406 into the strip of expanded dunnage 30, through each of the upper cover sheet material 20, the lower cover sheet material 22 and the expanded slit-sheet material 24, as the strip 30 is fed through the enveloping apparatus 40 and, as mentioned above, as the strip 30 is fed through the folding device 120. In the illustrative embodiment, the creaser 100 includes a dull blade roller 450 extending across the strip 30 that is configured, when rotated, to crease the strip 30 sequentially at two predetermined locations, that is, a first location longitudinally between the leading and trailing ends 300, 30D of the strip 30 to form the cross-wise extended crease 106, and a second location longitudinally spaced from the cross-wise extending crease 106 a distance equal to the length of the first strip portion 32. The dull blade roller 450 is arranged to engage a compliant surface 470 with the strip of expanded dunnage 30 therebetween. The compliant surface 470 may be made of any suitable compliant material that enables the dull blade roller 450 to impart the creases 106, 406 into the strip 30. In one form, the compliant material is polyurethane, and the compliant surface 470 is a polyurethane roller.

The dull blade roller 450 includes a dull blade 452 connected to a roller 454 along the length of the roller 454. The roller 454 is rotatably mounted at its opposite ends to the frame 150 of the dunnage conversion apparatus 12. A drive motor (not shown), for example a servo drive motor, is mounted to the frame 150 and coupled to the roller 454 to rotate the roller 454 and hence the dull blade roller 450. As will be appreciated, as the roller 454 rotates (clockwise in FIG. 12), the dull blade 452 will cooperate with the compliant surface 470, in the illustrated embodiment another roller 470 on the opposite side of, that is below, the strip 30, to crease the strip 30 therebetween.

Referring to FIGS. 11, 12 and 16, the dull bladed roller 450 creases the strip 30 simultaneously as the feeder 60 feeds the sheet materials 20, 22, 24 through the dunnage conversion apparatus 12, that is without stoppage of either the dull bladed roller 450 or the feeder 60. In one form, the dull bladed roller 450 is configured to make one complete rotation per crease 106, 406 and, accordingly, two complete rotations per one longitudinal strip of expanded dunnage 30.

Once creased, the strip of expanded dunnage 30 is ready to fold. Before folding, however, the adhesive applicator 110 applies adhesive to the upper surface of the outer cover sheet material 20. FIGS. 13-16 show greater detail of the adhesive applicator 110 and the folding device 120 of the enveloping apparatus 40 for making a pouch package 50. As will be more apparent from the description that follows, the creaser 100, the adhesive applicator 110, and the folding device 120 are configured such that the longitudinal strip of expanded dunnage 30 is fed nonstop through the enveloping apparatus 40. This increases the speed of production and reduces the need for, or the amount of, manual intervention required to make the pouch package 50.

Figure 14A:
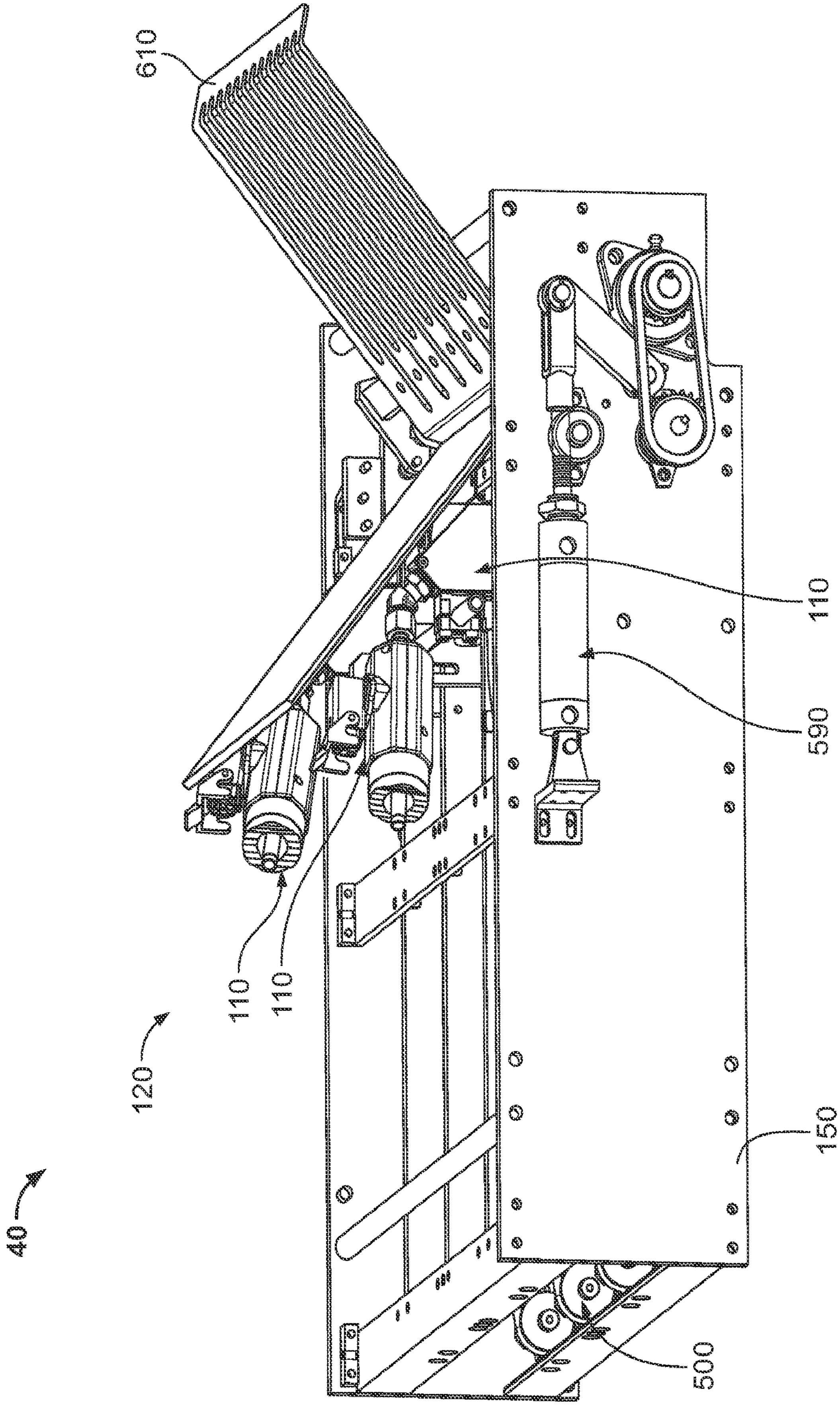
FIG. 14A is an enlarged rear perspective view of the folding device portion of the apparatus of FIG. 1.
Figure 14B:
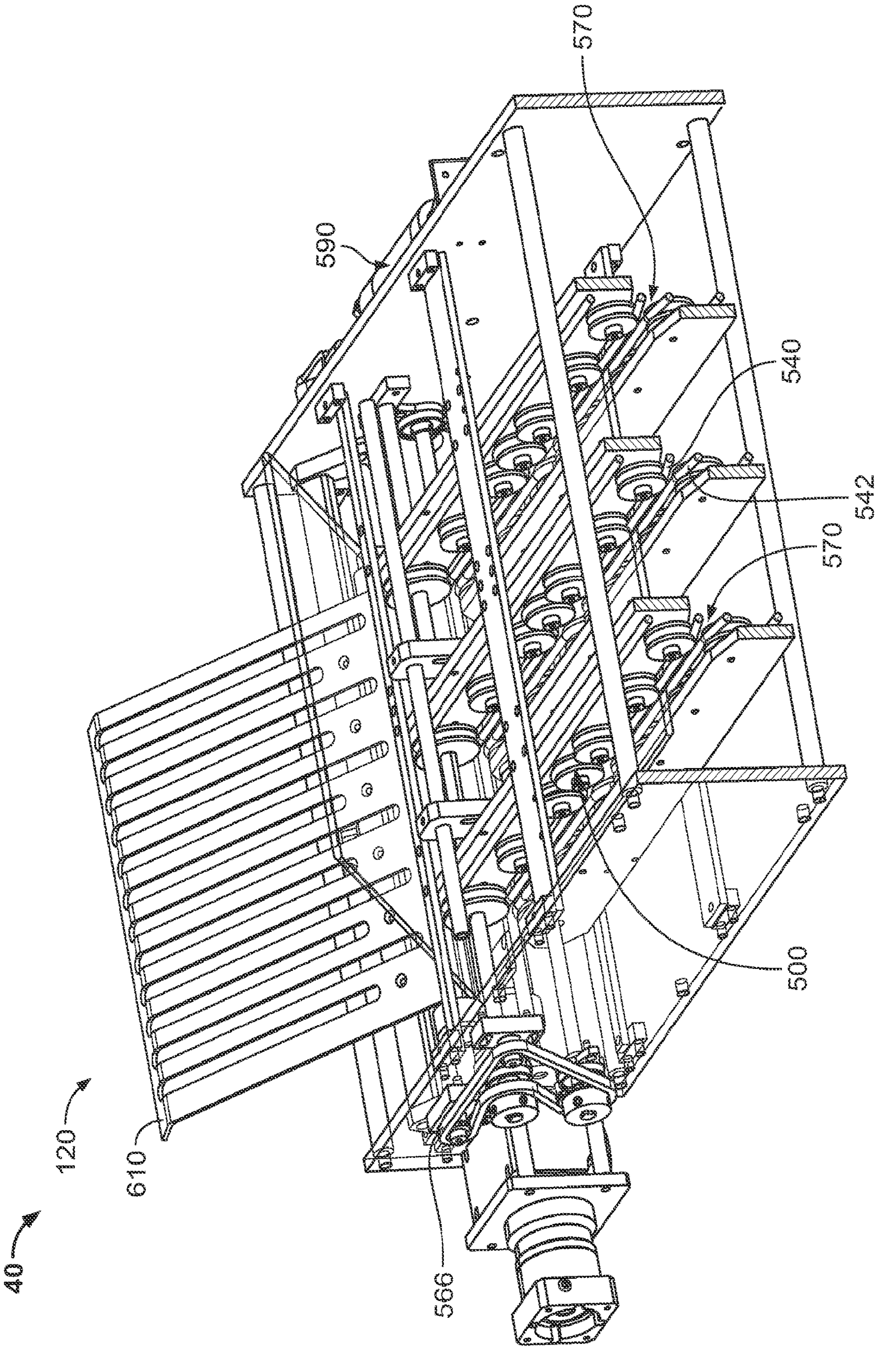
FIG. 14B is another enlarged side perspective view of the folding device portion of the apparatus of FIG. 1 as viewed from the right side of FIG. 1.
Figure 15:
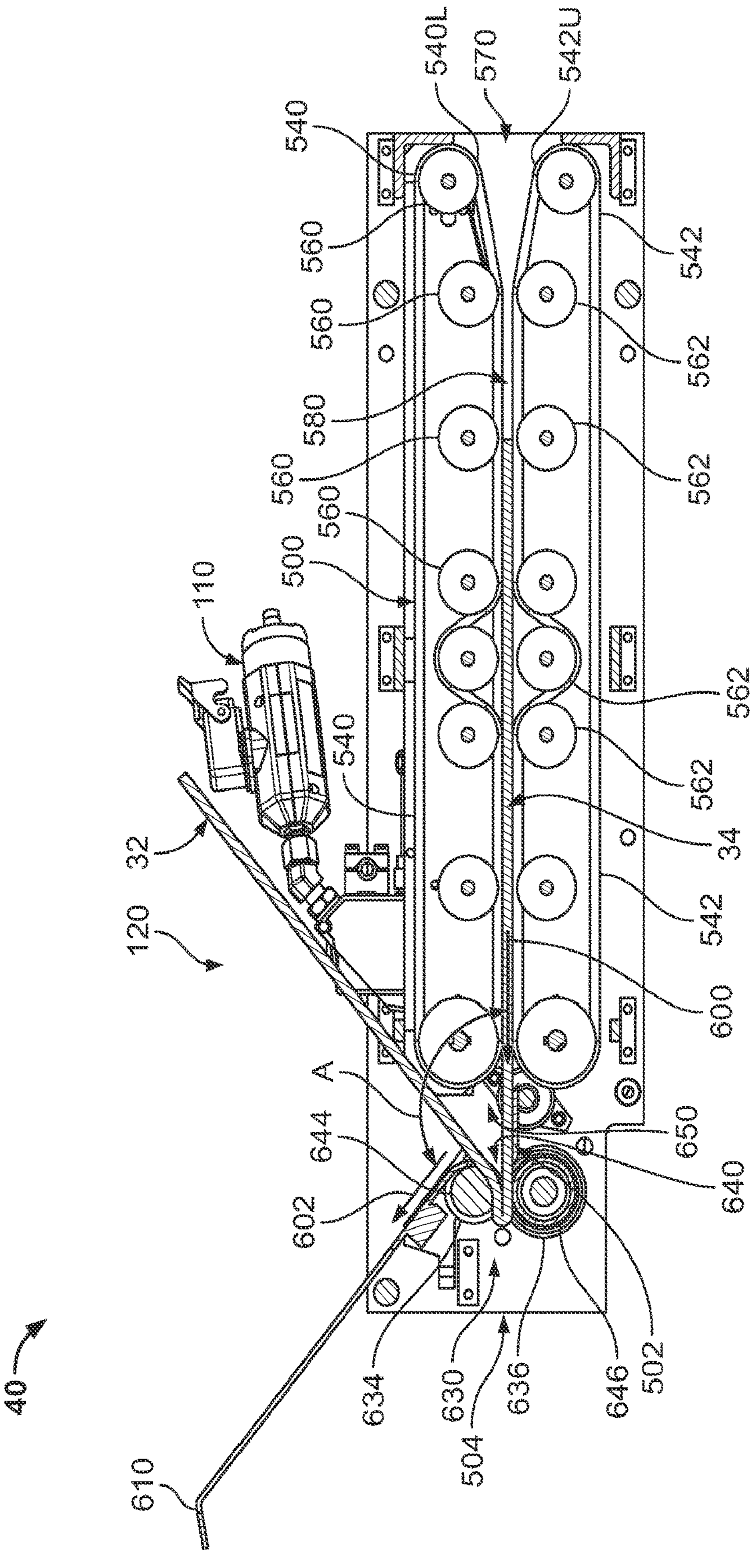
FIG. 15 is a side elevational view of the folding device portion of the apparatus of FIG. 13.

As shown in FIGS. 13-16, the folding device 120 includes a drive mechanism 500, a deflector 502, and a pinch mechanism 504, arranged in this order right to left in the longitudinal direction L. Referring to FIGS. 15 and 16, and as will be described in more detail below, the drive mechanism 500 drives the creased strip of expanded dunnage 30 to the deflector 502 to fold, at the cross-wise extending crease 106, the first strip portion 32 partially toward the second strip portion 34. A resulting partially folded strip 510 is folded at a first angle A between the first and second strip portions 32, 34. The pinch mechanism 504 receives the partially folded strip 510 and further folds the partially folded strip 510 such that the upper surface 32U of the first strip portion 32 overlays the upper surface 34U of the second strip portion 34. The pinch mechanism 504 thus further folds the strip 30 from the first angle A shown in the partially folded strip 510 to a second angle B shown in partially folded strip 520 to a fully folded strip or pouch package 50 where the angle of course is 0 (zero) degrees.

Figure 13:
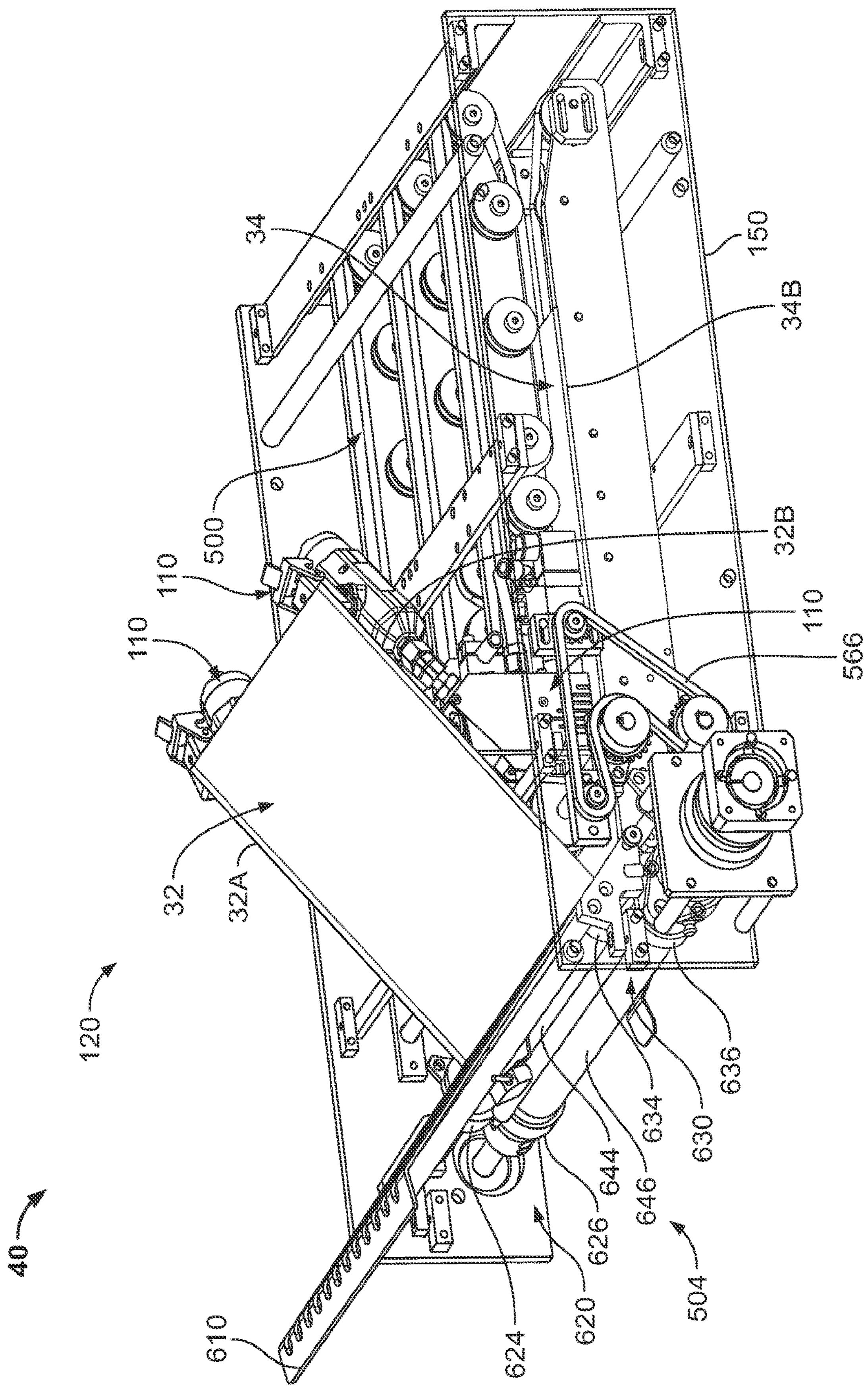
FIG. 13 is an enlarged perspective view of the folding device portion of the apparatus of FIG. 1.

The drive mechanism 500 of the folding device 120 is shown in greater detail in FIGS. 13-15. The drive mechanism 500 has upper and lower drive belts 540, 542 that frictionally engage the respective upper and lower surfaces 30U, 30L of the strip 30 to drive the strip 30 through the folding device 120. The upper and lower drive belts 540, 542 have a gap between belts that is smaller than the thickness of the strip 30 and set narrower than the width of the strip 30 to slightly compress and grip the strip 30 as it travels through the folding device 120. The drive belts 540, 542 may be driven in any suitable manner. In the illustrative example, the drive mechanism 500 includes an upper series of rollers 560 that in side elevational view drive the upper drive belt 540 clockwise and a lower series of rollers 562 that in side elevational view drive the lower drive belt 542 counterclockwise. As shown in FIGS. 13 and 14B, an S-drive belt 566 may be coupled to the upper and lower series of rollers 560, 562 to realize the clockwise and counterclockwise rotations of the respective upper and lower drive belts 540, 542. A motor (not shown) may be coupled to the S-drive belt 566 to drive the S-drive belt 566. The motor may be a servo motor for example.

As shown in FIG. 15, the upstream ends of the upper and lower drive belts 540, 542 are tapered to define a narrowing channel 570. Downstream from the narrowing channel 570 the lower surface 540L of the upper drive belt 540 and the upper surface 542U of the lower drive belt 542 define a feeding channel 580. In this way, the narrowing channel 570 is configured to guide the strip of expanded dunnage 30 into the feeding channel 580. The height of the feeding channel 580, that is the height between the lower surface 540L of the upper drive belt 540 and the upper surface 542U of the lower drive belt 542, is such that the upper and lower drive belts 540, 542 squeeze the strip 30 therebetween to enable the upper and lower drive belts 540, 542 to frictionally engage and thus drive the strip 30.

The length of engagement of the upper and lower drive belts 540, 542 with the respective upper and lower sides 30U, 30L of the strip 30 is selected to prevent or minimize crumpling or tearing of the strip 30 as the drive mechanism 500 drives the strip 30 through the folding device 120. To that end, the upper and lower drive belts 540, 542 may be configured to engage the strip of expanded dunnage 30 along the side edges where the layers of sheet material have already been compressed to bond the upper cover sheet material 20 to the lower cover sheet material 22. The expanded slit-sheet material 24 is sufficiently resilient, however, to enable the upper and lower drive belts 540, 542 to slightly compress the strip of expanded dunnage 30 without decreasing the cushioning properties of the strip 30.

The deflector 502 is positioned downstream from the drive mechanism 500 in the longitudinal direction L. Any suitable means may be used to drive the deflector 502. As shown in FIGS. 14A and 14B, the deflector 502 is driven by a pneumatic cylinder 590 between a deflecting position at which the deflector 502 deflects the first strip portion 32 of the strip of expanded dunnage 30 and a retracted position as shown in FIGS. 13 and 15. In the retracted position, the deflector 502 does not deflect the first strip portion 32 but is out of the path of the first strip portion 32. Referring to FIGS. 13, 15 and 16, the drive mechanism 500 and the deflector 502 are driven such that as the leading end 30L of the strip 30 approaches the deflector 502 the deflector 502 moves to the deflecting position to deflect the first strip portion 32 from a pre-deflector path 600 to a post-deflector path 602, wherein the post-deflector path 602 is sloped relative to the pre-deflector path 600 by the aforementioned first angle A (FIG. 16). As shown in FIGS. 13-15, the folding device 120 may be equipped with a ramp 610 that is coextensive with the deflector 502 in its deflecting position to aid the deflector 502 in guiding the first strip portion 32 along the post-deflector path 602.

As the first cross-wise extending crease 106 approaches the deflector 502, the deflector 502 is retracted to open a path to the pinch mechanism 504. The pinch mechanism 504 is positioned downstream from the deflector 502 in the longitudinal direction L. As shown in FIGS. 13 and 15, the pinch mechanism 504 includes a first pair 620 of an upper press wheel 624 and a lower press wheel 626 at the side edges 32A, 34A of the strip of expanded dunnage 30, and a second pair 630 of an upper press wheel 634 and a lower press wheel 636 at the opposite side edges 32B, 34B of the strip of expanded dunnage 30. In the illustrated embodiment, the pinch mechanism 504 also includes an upper drive roll 644 connected at its opposite ends to the upper press wheels 624, 634 and lower driven roll 646 connected at its opposite ends to the lower press wheels 626, 636. The same motor that drives the drive mechanism 500 also drives the pinch mechanism 504, which may be accomplished by a suitable mechanical linkage. In this way, the drive belts 540, 542 of the drive mechanism 500 and the first pair 620 of the upper and lower press wheels 624, 626 of the pinch mechanism 504, the second pair 630 of the upper and lower press wheels 634, 636, and the upper and lower rolls 644, 646, can be driven together simultaneously without stopping their respective rotations.

Referring to FIGS. 13 and 15, as the first strip portion 32 is directed along the post-deflector path 602, the first strip portion 32 is at a position that is above the upper press wheels 624, 634 of the pinch mechanism 504. As shown in FIG. 15, the first and second pairs 620, 630 of the upper and lower press wheels 624, 626, 634, 636 at their upstream end come together at a nip region 640. The pinch mechanism 504 is positioned relative to the drive mechanism 500 such that the nip region 640, with the deflector 502 in the retracted position (FIG. 15), aligns with the feeding direction of the drive mechanism 500. Thus, the nip region 640 is aligned with the trajectory of the feeding channel 580 or pre-deflector path 600 of the drive mechanism 500 that is blocked by the deflector 502 in the deflecting position and is opened when the deflector 502 is in the retracted position.

In operation, as the first strip portion 32 follows the post-deflector path 602 the first strip portion 32 is vertically above the pinch mechanism 504 so that the deflector 502 continues to deflect the first strip portion 32 along the post-deflector path 602. Meanwhile, the drive mechanism 500 continues to drive the second strip portion 34 along the pre-deflector path 600. Before or as the first cross-wise extending crease 106 of the strip 30 reaches the deflector 502, or approximately when the cross-wise extending crease 106 reaches a path change location 650 between the pre-deflector path 600 and the post-deflector path 602, the pneumatic cylinder 590 retracts the deflector 502 to the retracted position (FIG. 15). The continued driving of the second strip portion 34 by the drive mechanism 500 then urges the second strip portion 34 toward the nip region 640 of the pinch mechanism 504, which, owing to the cross-wise extending crease 106 in the strip 30, and the first strip portion 32 being positioned above the upper press wheels 624, 634, urges the first strip portion 32 to fold about the cross-wise extending crease 106. In this sense, the cross-wise extending crease 106 provides a weak point in the strip 30 that operates as a fold line.

Referring to FIGS. 15 and 16, it will be appreciated that the movement of the second strip portion 34, in effect, urges the cross-wise extending crease 106 leftward, which, in unison with action of the upper press wheels 624, 634, urges the portion of the first strip portion 32 below the tangential contact with the upper press wheels 624, 634 leftward and the portion of the first strip portion 32 above the tangential contact with the upper press wheels 624, 634 rightward. The further continued driving of the second strip portion 34 toward and into the nip region 640 causes the upper press wheels 624, 634 to urge the upper surface 32U of the first strip portion 32 toward the upper surface 34U of the second strip portion 34, for example as represented by the transition from the angle A to the angle B in FIG. 16. The upper press wheels 624, 634 and lower press wheels 626, 636 of the pinch mechanism 504 then nip or pinch the first and second strip portions 32, 34 together, thereby urging the upper surface 32U of the first strip portion 32 to overlay the upper surface 34U of the second strip portion 34, as the press wheels 624, 634, 632, 634 drive the strip 30 through pinch mechanism 504, for example as represented by the transition from the angle B to zero degrees in FIG. 16.

As shown in FIGS. 13 and 15, when the first strip portion 32 is folded relative to the second strip portion 34, the first strip portion 32 may approach the adhesive applicator 110. The enveloping apparatus 40 may include one or more guide panels (not shown) to guide the folded first strip portion 32 of the strip 30 away from the adhesive applicator 100 or otherwise to prevent the first strip portion 32 from contacting the adhesive applicator 110. Also, to aid in initiating the folding of the first strip portion 32 relative to the second strip portion 34, one or more air jets (not shown) may be provided to assist in pushing the first strip portion 32 away from the ramp 610 (to the right in FIGS. 13 and 15). For example, a horizontal pneumatic tube may be provided behind the ramp 610 with the air jets projecting from the tube and through slots in the ramp 610. Such an air-jet-assist may be particularly helpful for longer pouch packages. In this regard, it will be appreciated that the length of the guide panels and the ramp 610, as well as the placement of the air jets, may vary depending on the desired length pouch package 50.

The performance of the pinch mechanism 504 may also be enhanced by the upper drive roll 644 and the lower driven roll 646. Still referring to FIGS. 13 and 15, it can be seen that the diameters of the upper and lower rolls 644, 646 are less than the diameters of the respective press wheels 624, 634, 626, 636 to which they are connected. The diameters of the upper and lower rolls 644, 646 are selected such that the height of the gap between the upper and lower rolls 644, 646 is less than the height of the folded strip 30 passing therebetween. In this way, the upper drive roll 644 and the lower driven roll 646 provide stability to the folded strip 30 as it is pinched between the upper wheels 624, 634 and lower wheels 626, 636. The upper and lower rolls 644, 646 also compress the folded strip 30 to flatten it and align the edges.

Turning to FIGS. 1, 14A and 15, it can be seen that the adhesive applicator 110 is positioned at the downstream end of the drive mechanism 500, upstream from the pinch mechanism 504 and the deflector 503, in the longitudinal direction L. With reference to FIG. 16, and as earlier noted, the adhesive applicator 110 is configured to apply the adhesive 116 on the upper surface 34U of the second strip portion 34 at each of the opposite sides 34A, 34B of the second strip portion 34 from the cross-wise extending crease 106 longitudinally toward the trailing end 30D of the strip 30. The adhesive 116 can be any adhesive suitable for bonding the upper surface 32U of the first strip portion 32 to the upper surface 34U of the second strip portion 34, for example, a hot glue adhesive. The adhesive applicator 110 is configured to apply the adhesive 116 to the upper surface 34U of the second strip portion 34 as the drive mechanism 500 drives the second strip portion 34 to the adhesive applicator 110. The adhesive applicator 110 has two adhesive heads 684, in the illustrated embodiment two hot glue heads, mounted to the frame 150 at opposite sides of the strip 30 above the feed path of the strip 30 at a sufficient height to allow passage of the strip 30 through the drive mechanism 500. In one form, the adhesive heads 684 may be activated by means of respective pneumatic solenoid valves integrated in the structure of the adhesive heads 684. One adhesive head 684 applies a bead of adhesive 116 to one side 34A of the second strip portion 34, and the other, opposite, side adhesive head 684 applies a bead of adhesive 116 to the opposite side 34B of the second strip portion 34.

Referring again to FIG. 16, the beads of adhesive 116 are shown applied to the opposite sides 34A, 34B of the second strip portion 34 on the upper surface 34U thereof. In FIG. 16, the sequence of figures from the top figure to the bottom figure represents, respectively, the earliest in time to the latest in time of the drive mechanism 500 feeding the strip 30 to and below the adhesive heads 684 as the adhesive heads 684 apply the adhesive 116 to the upper surface 34U of the second strip portion 34. Referring to FIGS. 13, 14A, 15 and 16, the drive mechanism 500 and the adhesive applicator 110 operate simultaneously, that is without stoppage, to apply the adhesive 116 to the second strip portion 34 at the opposite sides 34A, 34B of the second strip portion 34. If the desired pouch package 50 is to include a flap 436, the adhesive applicator 100 applies the adhesive 116 from the cross-wise extending crease 106 longitudinally toward the trailing end 30D of the strip 30 up to the second cross-wise extending crease 406. If the desired pouch package 50 is not to have a flap 436, then the adhesive applicator 100 applies the adhesive 116 from the cross-wise extending crease 106 longitudinally toward the trailing end 30D of the strip 30 either up to or near the edge of the trailing end 30D.

Once the adhesive applicator 110 has applied the adhesive 116 to the opposite sides 34A, 34B of the second strip portion 34, and the deflector 502 and pinch mechanism 504 together fold the first strip portion 32 to overlay the second strip portion 34, the first and second strip portions 32, 34 are compressed together by the continued action of the pinch mechanism 504. Thus, the upper press wheels 624, 634 above the strip 30 and the lower press wheels 626, 636 below the strip 30 drive the overlayed first and second strip portions 32, 34 therebetween to compress the opposite sides 32A, 32B of the first strip portion 32 to the respective opposite sides 34A, 34B of the second strip portion 34, thereby adhesively bonding the first strip portion 32 to the second strip portion 34 and yielding the pouch package 50 (FIG. 16). Further, the gap between the upper drive roll 644 and the lower driven roll 646 of the pinch mechanism 504 is less than the thickness of the strip 30 to compress the strip 30, which is believed to help maintain the alignment of the strip 30 as it moves between the upper press wheels 624, 634 and the lower press wheels 626, 636. Additionally, a pair of ironing rollers (not shown) with a uniform diameter and a spacing that is less than the thickness of the strip 30 may be employed upstream or downstream of the folding device 120 to adjust the thickness of the strip 30 prior to folding or to remove wrinkles formed in the outer cover sheet material (the lower cover sheet material 22) during the folding operation.

Figure 17:
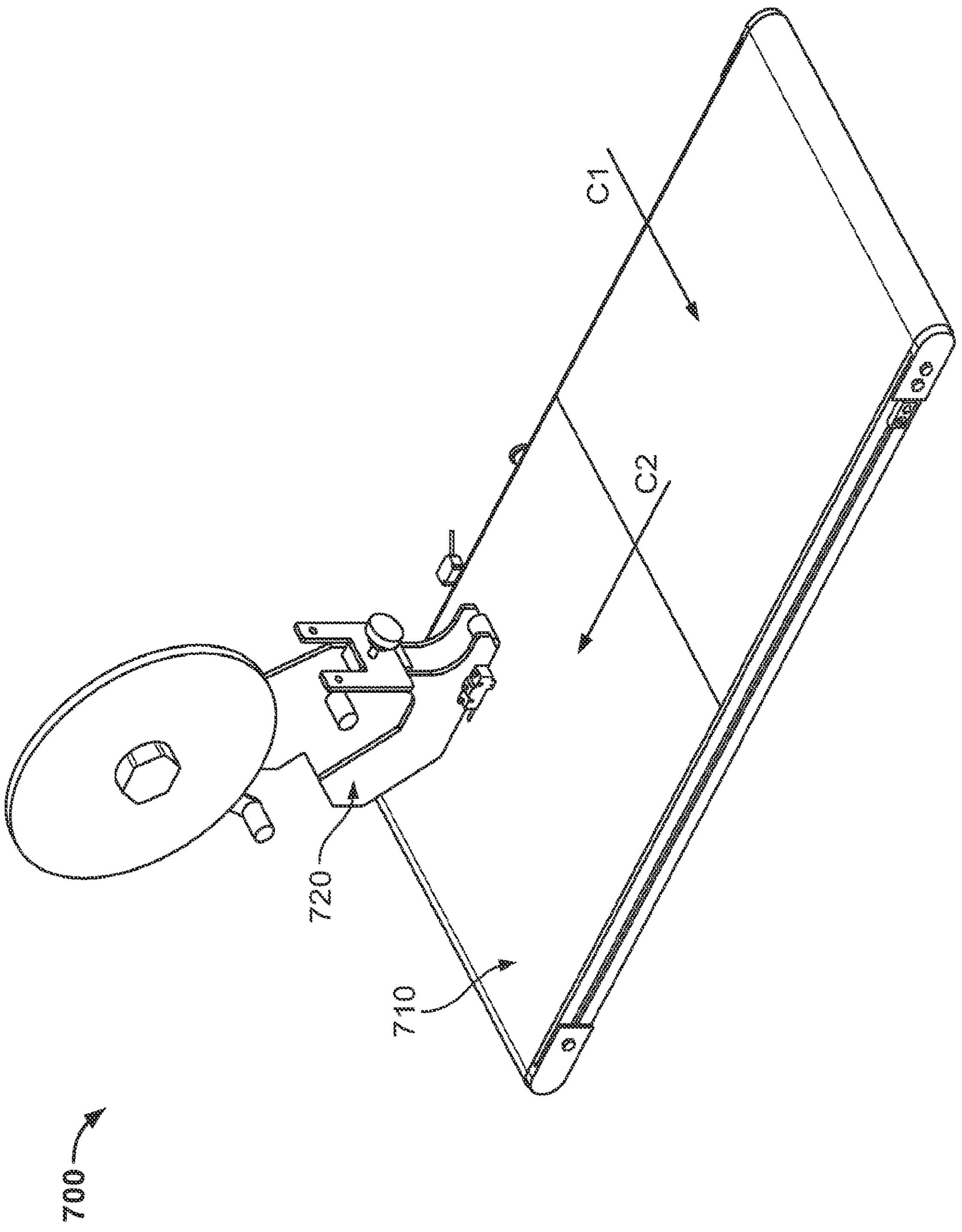
FIG. 17 shows a closing-adhesive station portion of the apparatus of FIG. 1.

Once the pouch package 50 is formed, the pouch package 50 is delivered to a closing-adhesive station 700. Turning to FIGS. 1 and 17, the closing-adhesive station 700 includes a conveyor 710 on which the pouch package 50 is deposited by the folding device 120 and a transverse adhesive applicator 720 that is configured to apply a strip of adhesive to the pouch package 50 adjacent the leading end 30C (see FIG. 16) of the strip of expanded dunnage 30 of the pouch package 50.

The folding device 120 deposits the pouch package 50 on the conveyor in a direction C1, which is the longitudinal direction L. The conveyor 710 is arranged to move the pouch package 50 in a direction C2 that is perpendicular to the longitudinal direction L so that the transverse adhesive applicator 720 can apply the strip of adhesive across the leading end 30C of the strip 30. An exemplary transverse adhesive applicator 720 applies a strip of double-sided tape with a release liner. The end user simply removes the release liner, folds the flap 436 over the fold line 406 and presses the exposed adhesive tape surface to another portion of the pouch package 50 to close an open end and seal an article in the pouch package 50.

An alignment device (not shown) may be provided to keep the pouch aligned for application of an adhesive for closing the pouch. For example, a backstop rail (not shown) may be provided against which the first cross-wise extending crease 106 may be stopped in the longitudinal direction L. Pneumatic lines (not shown) may be provided to blow the completed pouch against the rail so that it is aligned when it moves to the tape applicator.

Finally, as shown in FIG. 1, the automated pouch package-making apparatus 10 includes a controller 750 for generally coordinating and controlling the operation of the pouch package-making apparatus 10 and each of its component parts including the feeder 60, the cross adhesive applicator 70, the layering device 80, the cross pressure applicator 90, the creaser 100, the adhesive applicator 110, and the folding device 120. The controller 750 may include a processor, a memory, and a program stored in the memory. The controller 750 may additionally include one or more input devices, such as for determining the desired length of the pouch package 50 and/or the flap 436, and one or more outputs, including outputs for controlling elements of the pouch package-making apparatus 10. The input devices can be connected to or include one or more of a touch screen display 752 as shown in FIG. 1, and/or a keyboard, a mouse, a scanner or sensor, a bar code reader, a radio frequency identification device (RFID) sensor, a microphone, a camera, etc. The controller 750 can be programmed to recognize the appropriate inputs that represent a desired length of the pouch package 50 and/or the flap 436 or identify a location to look up one or more available lengths.

As will be appreciated, the automated pouch package-making apparatus 10 may be operated to make any desired length or width of pouch package 50. Different lengths may be obtained for example by lengthening the feeding period and decreasing the cutting and creasing frequency. Different widths may be obtained for example by providing different widths of upper cover sheet material 20, lower cover sheet material 22 and expanded slit-sheet material 24.

FIG. 1 also shows that the feeder 60, the cross adhesive applicator 70, the layering device 80, the cross pressure applicator 90, the creaser 100, and the folding device 120, are each configured as a subassembly on a respective subframe 802, 804, 806, 808, 810, 812, where the subframes 802, 804, 806, 808, 810, 812 are adjustable relative to one another in the longitudinal direction L, for example, on parallel rails 840 at opposite sides of the frame 150.

A method for converting an upper cover sheet material, a lower cover sheet material and an expanded slit-sheet material into a strip of expanded dunnage, will now be described. The method may be carried out by the afore described dunnage conversion apparatus 12 and its various components. The method includes the step of feeding an upper cover sheet material, a lower cover sheet material and an expanded slit-sheet material, each having parallel opposite side edges, in a longitudinal direction. The method also includes applying adhesive across the upper surface of the lower cover sheet material in a direction perpendicular to the parallel opposite side edges of the lower cover sheet material. The method also includes layering the upper cover sheet material upon the upper surface of the lower cover sheet material with the expanded slit-sheet material therebetween to form a layered product. The method also includes applying a pressure to the layered product at the location of the adhesive applied across the upper surface of the lower cover sheet material to bond the lower surface of the upper cover sheet material to the upper surface of the lower cover sheet material.

The method may additionally include applying the pressure to the layered product as the upper cover sheet material, the lower cover sheet material and the expanded slit-sheet material are fed in the longitudinal direction.

The method may include applying the adhesive across the upper surface of the lower cover sheet material as the lower cover sheet material is fed in the longitudinal direction.

The method may additionally include applying adhesive to an upper surface of the lower cover sheet material adjacent opposite longitudinal sides of the lower cover sheet material.

The method may include applying the adhesive to the upper surface of the lower cover sheet material as the lower cover sheet material is fed in the longitudinal direction.

A method for making a pouch package from a strip of expanded dunnage having upper and lower surfaces, opposite leading and trailing ends and opposite longitudinal sides, will now be described. The method may be carried out by the afore described enveloping apparatus 40 and its various components. The method includes the step of creasing the strip with a cross-wise extending crease across the width of the strip at a location longitudinally between the leading and trailing ends of the strip to form a first strip portion and a second strip portion on longitudinally opposite sides of the cross-wise extending crease. The method also includes applying an adhesive on the upper surface of the second strip portion at each of the opposite longitudinal sides of the second strip portion from the cross-wise extending crease longitudinally toward one of the leading end and the trailing end of the strip. The method also includes folding the strip upon itself, at the cross-wise extending crease, such that the upper surface of the first strip portion overlays the upper surface of the second strip portion, and compressing the opposite longitudinal sides of the first strip portion to the respective opposite longitudinal sides of the second strip portion along the respective locations of the longitudinally extending adhesive to bond the opposite longitudinal sides of the first strip portion to the respective opposite longitudinal sides of the second strip portion.

The method may additionally include deflecting the first strip portion from a pre-deflector path to a post-deflector path, wherein the post-deflector path is sloped relative to the pre-deflector path.

The method may include stopping deflecting the first strip portion when the cross-wise extending crease reaches a path change location between the pre-deflector path and the post-deflector path.

The method may additionally include pinching opposite sides of the strip between first and second pairs of upper and lower press wheels at respective opposite sides of the strip to compress, as the strip is pinched, the opposite sides of the first strip portion to the respective opposite sides of the second strip portion.

The method may additionally include frictionally engaging the respective upper and lower surfaces of the strip to drive the strip to the first and second pairs of upper and lower press wheels.

In summary, an exemplary automated pouch package-making apparatus 10 includes a dunnage conversion apparatus 12 that converts sheet material 20, 22, 24 into a longitudinal strip of expanded dunnage 30, and an enveloping apparatus 40 downstream of the dunnage conversion apparatus 12 that forms the expanded dunnage 30 into a pouch package 50. The dunnage conversion apparatus 12 includes a layering device 60 to layer an upper cover sheet material 20 upon a lower cover sheet material 22 with an expanded slit-sheet material 24 therebetween, and a cross pressure applicator 90 to apply a pressure to the layered product 86 to bond via an adhesive 76, 78 a lower surface 20L of the upper cover sheet material 20 to an upper surface 22U of the lower cover sheet material 22, thereby forming a strip of expanded dunnage 30. The enveloping apparatus 40 includes a folding device 120 to fold the strip 30 upon itself, at a cross-wise extending crease 106, such that an upper surface 32U of a first strip portion 32 overlays an upper surface 34U of a second strip portion 34, and to compress the opposite longitudinal sides 32A, 32B, 34A, 34B of the strip 30 along respective locations of longitudinally extending adhesive 116 to bond the opposite longitudinal sides 32A, 32B, 34A, 34B of the strip 30.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

We claim:

1. A dunnage conversion apparatus for converting an upper cover sheet material, a lower cover sheet material and an expanded slit-sheet material into a strip of expanded dunnage, the apparatus comprising:

a feeder configured to feed an upper cover sheet material, a lower cover sheet material and an expanded slit-sheet material, each having parallel opposite side edges, in a longitudinal direction through the apparatus;

a cross adhesive applicator configured to apply adhesive across the upper surface of the lower cover sheet material in a direction perpendicular to the parallel opposite side edges of the lower cover sheet material;

a layering device downstream of the cross adhesive applicator that is configured to layer the upper cover sheet material upon the upper surface of the lower cover sheet material with the expanded slit-sheet material therebetween to form a layered product; and, a cross pressure applicator configured to apply a pressure to the layered product at the location of the adhesive applied across the upper surface of the lower cover sheet material to bond the lower surface of the upper cover sheet material to the upper surface of the lower cover sheet material;

wherein the cross adhesive applicator includes an adhesive head configured to move across the lower cover sheet material along a linear path in a direction transverse to the longitudinal direction; and wherein the linear path is at a non-perpendicular angle relative to the longitudinal direction.

2. The dunnage conversion apparatus according to claim 1, wherein the cross pressure applicator includes a cammed roller extending across the layered product and configured, when rotated, to compress the layered product at the location of the adhesive applied across the upper surface of the lower cover sheet material.

3. The dunnage conversion apparatus according to claim 1, wherein the cross adhesive applicator is configured to apply the adhesive across the upper surface of the lower cover sheet material while the lower cover sheet material is moving through the apparatus.

4. The dunnage conversion apparatus according to claim 1, wherein the cross adhesive applicator includes a linear actuator configured to translate the adhesive head across the lower cover sheet material along the linear path.

5. The dunnage conversion apparatus according to claim 1, wherein the cross adhesive applicator includes an adhesive head having a split nozzle to apply parallel first and second beads of adhesive across the upper surface of the lower cover sheet material, the first and second beads being spaced apart in the longitudinal direction.

6. The dunnage conversion apparatus according to claim 5, wherein the cross pressure applicator includes a cammed roller extending across the layered product and configured, when rotated, to compress the layered product at the location of the first and second beads of adhesive applied across the upper surface of the lower cover sheet material.

7. The dunnage conversion apparatus according to claim 5, further comprising a cutter configured to sever a discrete strip of expanded dunnage from the layered product between the first and second beads of adhesive.

8. The dunnage conversion apparatus according to claim 1, further comprising a side adhesive applicator configured to apply adhesive to an upper surface of the lower cover sheet material adjacent opposite longitudinal sides of the lower cover sheet material.

9. The dunnage conversion apparatus according to claim 8, wherein the side adhesive applicator is configured to apply the adhesive to the upper surface of the lower cover sheet material as the lower cover sheet material is fed through the apparatus.

10. The dunnage conversion apparatus according to claim 8, further comprising a side pressure applicator configured to apply a pressure to the layered product at the location of the adhesive applied to the opposite sides of the lower cover sheet material to bond the lower surface of the upper cover sheet material to the upper surface of the lower cover sheet material.

11. The dunnage conversion apparatus according to claim 10, wherein the side pressure applicator is configured to apply the pressure to the layered product as the upper cover sheet material, the lower cover sheet material and the expanded slit-sheet material are fed through the apparatus.

12. The dunnage conversion apparatus according to claim 10, wherein the side pressure applicator includes first and second pairs of upper and lower bonding rollers at respective opposite sides of the layered product, the upper bonding rollers and the lower bonding rollers being configured to pinch the opposite sides of the layered product as the layered product passes between the upper bonding rollers and the lower bonding rollers.

13. The dunnage conversion apparatus according to claim 1, in combination with an expander, wherein the expander is configured to expand a slit-sheet material into the expanded slit-sheet material, wherein in the longitudinal direction the cross adhesive applicator is downstream of the expander.

14. The dunnage conversion apparatus according to claim 1, further comprising:

a creaser to crease the strip with a cross-wise extending crease across the width of the strip at a location longitudinally between the leading and trailing ends of the strip to form a first strip portion and a second strip portion on longitudinally opposite sides of the cross-wise extending crease;

an adhesive applicator to apply an adhesive on the upper surface of the second strip portion at each of the opposite longitudinal sides of the second strip portion from the cross-wise extending crease longitudinally toward one of the leading end and the trailing end of the strip; and, a folding device to fold the strip upon itself, at the cross-wise extending crease, such that the upper surface of the first strip portion overlays the upper surface of the second strip portion, and to compress the opposite longitudinal sides of the first strip portion to the respective opposite longitudinal sides of the second strip portion along the respective locations of the longitudinally extending adhesive to bond the opposite longitudinal sides of the first strip portion to the respective opposite longitudinal sides of the second strip portion.

15. The dunnage conversion apparatus according to claim 14, wherein the folding device includes a deflector that is configured to move between a deflecting position at which the deflector deflects the first strip portion from a pre-deflector path and a retracted position at which the deflector does not deflect the first strip portion from the pre-deflector path.

16. A method for converting an upper cover sheet material, a lower cover sheet material and an expanded slit-sheet material into a strip of expanded dunnage, the method comprising the following steps:

feeding an upper cover sheet material, a lower cover sheet material and an expanded slit-sheet material, each having parallel opposite side edges, in a longitudinal direction;

applying adhesive across the upper surface of the lower cover sheet material in a direction perpendicular to the parallel opposite side edges of the lower cover sheet material;

layering the upper cover sheet material upon the upper surface of the lower cover sheet material with the expanded slit-sheet material therebetween to form a layered product; and, applying a pressure to the layered product at the location of the adhesive applied across the upper surface of the lower cover sheet material to bond the lower surface of the upper cover sheet material to the upper surface of the lower cover sheet material;

wherein the step of applying adhesive across the upper surface of the lower cover sheet material in a direction perpendicular to the parallel opposite side edges of the lower cover sheet material, includes moving an adhesive head across the lower cover sheet material along a linear path in a direction both transverse to the longitudinal direction and at anon-perpendicular angle relative to the longitudinal direction.

17. The method according to claim 16, comprising applying the pressure to the layered product as the upper cover sheet material, the lower cover sheet material and the expanded slit-sheet material are fed in the longitudinal direction.

18. The method according to claim 16, comprising applying the adhesive across the upper surface of the lower cover sheet material as the lower cover sheet material is fed in the longitudinal direction.

19. The method according to claim 16, further comprising applying adhesive to an upper surface of the lower cover sheet material adjacent opposite longitudinal sides of the lower cover sheet material.

20. The method according to claim 19, comprising applying the adhesive to the upper surface of the lower cover sheet material as the lower cover sheet material is fed in the longitudinal direction.

* * * * *